US007891588B2

(12) United States Patent
Jones et al.

(10) Patent No.: US 7,891,588 B2
(45) Date of Patent: Feb. 22, 2011

(54) QUICK DISCONNECT FOR WETTED PARTS IN A PAINT SPRAY GUN

(75) Inventors: Michael B. Jones, Excelsior, MN (US); Richard Paul Anderson, Burnsville, MN (US); Allen Arden Caldwell, Shakopee, MN (US); Brian David Denker, Rogers, MN (US); Charles Thomas Graves, Woodbury, MN (US); Christopher John Herman, White Bear Lake, MN (US); Robert Ernest Miller, Savage, MN (US); Lance Talbot Molby, Chanhassen, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 1163 days.

(21) Appl. No.: 11/421,390

(22) Filed: May 31, 2006

(65) Prior Publication Data

US 2007/0278787 A1 Dec. 6, 2007

(51) Int. Cl.

| | |
|---|---|
| ***B05B 7/26*** | (2006.01) |
| ***B05B 7/02*** | (2006.01) |
| ***B05B 1/00*** | (2006.01) |
| ***A01G 25/14*** | (2006.01) |
| ***F16L 37/20*** | (2006.01) |

(52) U.S. Cl. ....................... 239/600; 239/315; 239/375; 239/525; 239/DIG. 14; 285/311; 285/317

(58) Field of Classification Search ................. 239/302, 239/308, 315, 320, 321, 341, 348, 365, 375, 239/392, 418, 525, 526, 531, 600, DIG. 14; 285/45, 46, 47, 311, 317

See application file for complete search history.

(56) References Cited

U.S. PATENT DOCUMENTS 3,462,082 A 8/1969 Everett (Continued)

FOREIGN PATENT DOCUMENTS

EP 0457252 11/1991

(Continued)

OTHER PUBLICATIONS

United Kingdom search report for U.S. Appl. No. 11/421,390, mailed Sep. 18, 2007, 8 pp.

(Continued)

*Primary Examiner*—Len Tran
*Assistant Examiner*—Ryan Reis
(74) *Attorney, Agent, or Firm*—Faegre & Benson LLP

(57) ABSTRACT

Apparatus and method for quickly disconnecting a wetted parts subassembly from a paint spray gun wherein the wetted parts subassembly includes a spray tip, pump cylinder and piston and paint cup components including a pump housing cylinder support carrying the pump cylinder and having a pair of protrusions formed on a pump housing cylinder support, a frame having a pair of slots aligned to receive the protrusions when the pump housing cylinder support is received in the frame, a locking lever pivotably attached to the frame adjacent at least one of the slots and movable between a latched position wherein the pump housing cylinder support is retained to the frame, and an unlatched position wherein the pump housing cylinder support is removable from the frame. A passive retention feature frictionally engages the wetted parts subassembly with the frame when the wetted parts subassembly is received in the frame.

17 Claims, 41 Drawing Sheets

U.S. PATENT DOCUMENTS

| | | | | | |
|---|---|---|---|---|---|
| 3,899,134 | A | | 8/1975 | Wagner | |
| 4,174,071 | A | | 11/1979 | Lau et al. | |
| 4,348,180 | A | | 9/1982 | Schuss | |
| 4,350,298 | A | | 9/1982 | Tada | |
| 4,364,520 | A | | 12/1982 | Weber, Sr. | |
| 4,442,977 | A | | 4/1984 | Beiswenger et al. | |
| 4,692,049 | A | | 9/1987 | Engle | |
| 4,693,423 | A | | 9/1987 | Roe et al. | |
| 4,804,144 | A | | 2/1989 | Denman | |
| 4,971,251 | A | | 11/1990 | Dobrick et al. | |
| 5,056,717 | A | * | 10/1991 | Koide | 239/332 |
| 5,209,365 | A | * | 5/1993 | Wood | 220/212 |
| 5,395,051 | A | * | 3/1995 | Anderson et al. | 239/127 |
| 5,437,119 | A | | 8/1995 | Womack | |
| 5,603,434 | A | | 2/1997 | von Schuckmann | |
| 5,609,302 | A | * | 3/1997 | Smith | 239/526 |
| 5,709,684 | A | | 1/1998 | Errico et al. | |
| 5,799,501 | A | | 9/1998 | Leonard et al. | |
| 5,799,552 | A | | 9/1998 | Curtis | |
| 5,816,501 | A | | 10/1998 | LoPresti et al. | |
| 5,890,632 | A | | 4/1999 | Chalupsky et al. | |
| 5,984,151 | A | | 11/1999 | Lohrman et al. | |
| 5,992,690 | A | | 11/1999 | Tracy | |
| 6,168,093 | B1 | | 1/2001 | Greer, Jr. et al. | |
| 6,170,709 | B1 | | 1/2001 | Huang | |
| 6,341,736 | B1 | | 1/2002 | Liao | |
| 6,631,855 | B2 | * | 10/2003 | Huang | 239/526 |
| 6,805,306 | B1 | * | 10/2004 | Huang | 239/375 |
| 7,484,676 | B2 | * | 2/2009 | Joseph et al. | 239/290 |
| 2003/0201340 | A1 | | 10/2003 | Hanson | |

FOREIGN PATENT DOCUMENTS

| | | |
|---|---|---|
| GB | 2181491 | 10/1985 |
| JP | 2003191995 | 12/2001 |
| JP | 2004243269 | 2/2003 |
| WO | 9014167 | 11/1990 |
| WO | 9617689 | 6/1996 |

OTHER PUBLICATIONS

Supplementary Search report from United Kingdom application No. 0709554.0, dated Mar. 5, 2008, 2 pp.

* cited by examiner

QUICK DISCONNECT FOR WETTED PARTS IN A PAINT SPRAY GUN

BACKGROUND OF THE INVENTION

The present invention relates to the field of hand held paint spray guns, popularly known as "cup guns" in which the paint being sprayed is typically carried in a cup or container attached directly to the gun for spraying coating materials such as paint and similar materials (collectively referred to herein simply as "paint").

In prior art cup guns, it was typical to require a user to unthread a number of parts to disassemble the wetted parts of the gun for cleaning or service. In one type of prior art cup gun, a user was required to unscrew a spray tip using a circular guard to gain access to the wetted side of the spray tip and a swirl valve, and then the user was required to unscrew a piston locking ring or nut to release the remaining wetted parts including the piston, piston cylinder and paint cup. Once the parts were disassembled, they could be cleaned or replaced before being reassembled for spraying by reversing the above process.

BRIEF SUMMARY OF THE INVENTION

The present invention provides a new level of convenience to a user by eliminating the need to unscrew a piston locking ring or nut, and in fact eliminates that part entirely. In the practice of the present invention, a quick disconnect apparatus retains the wetted parts to the remainder of the spray gun and allows a user to rapidly and conveniently separate the wetted parts subassembly from the remainder of the spray gun by depressing a pair of buttons projecting through the gun housing or operating a latch mechanism to unlatch and release the wetted parts subassembly.

In another aspect, the present invention provides a spray gun that reduces wear on the quick disconnect apparatus, increasing the life of the spray gun. In the practice of the present invention, forces exerted on the wetted parts subassembly through operation of the device are transferred to the remainder of the spray gun at a designated, reinforced interface. This allows the quick disconnect apparatus, including, for example, the pair of buttons projecting through the gun housing and the associated latch mechanism, to be constructed of a material that is less resistant to chronic stress.

DETAILED DESCRIPTION OF THE INVENTION

Figure 1:
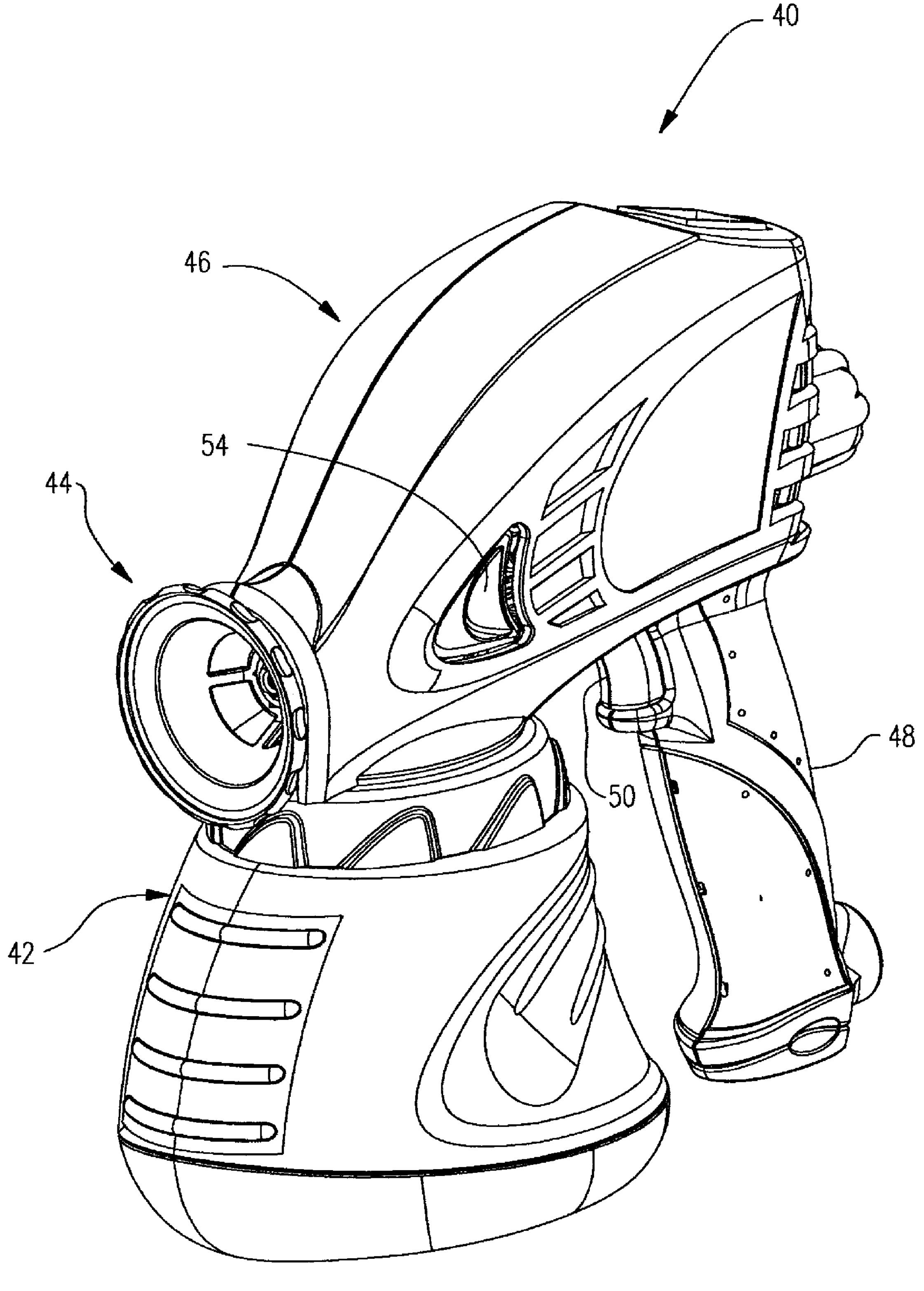
FIG. 1 is a perspective view of a paint spray gun useful in the practice of the present invention, with the gun in an assembled condition.

Referring now to the Figures, and most particularly to FIG. 1, a paint spray gun 40 useful in the practice of the present invention may be seen. Spray gun 40 is shown in an assembled condition in FIG. 1. Spray gun 40 may have a paint cup 42 and a spray nozzle 44 for atomizing paint or other coating material contained in the cup 42. Gun 40 may also have a housing 46 containing a drive motor and forming a handle 48 with a trigger 50.

Paint gun 40 is operable in a spraying session by providing electrical power to the gun 40 via a conventional electric cord (not shown) and depressing trigger 50. Paint or other coating material contained in cup 42 is drawn into a pump housing and cylinder assembly (described infra) and delivered via nozzle 44 as an atomized spray to a surface to be coated. Once the spraying session is completed, the gun 40 and more particularly, the parts of the gun which have been in contact with the paint (herein referred to collectively as a “wetted parts subassembly”) must be cleaned to ready the gun 40 for storage in between spraying sessions.

Figure 2:
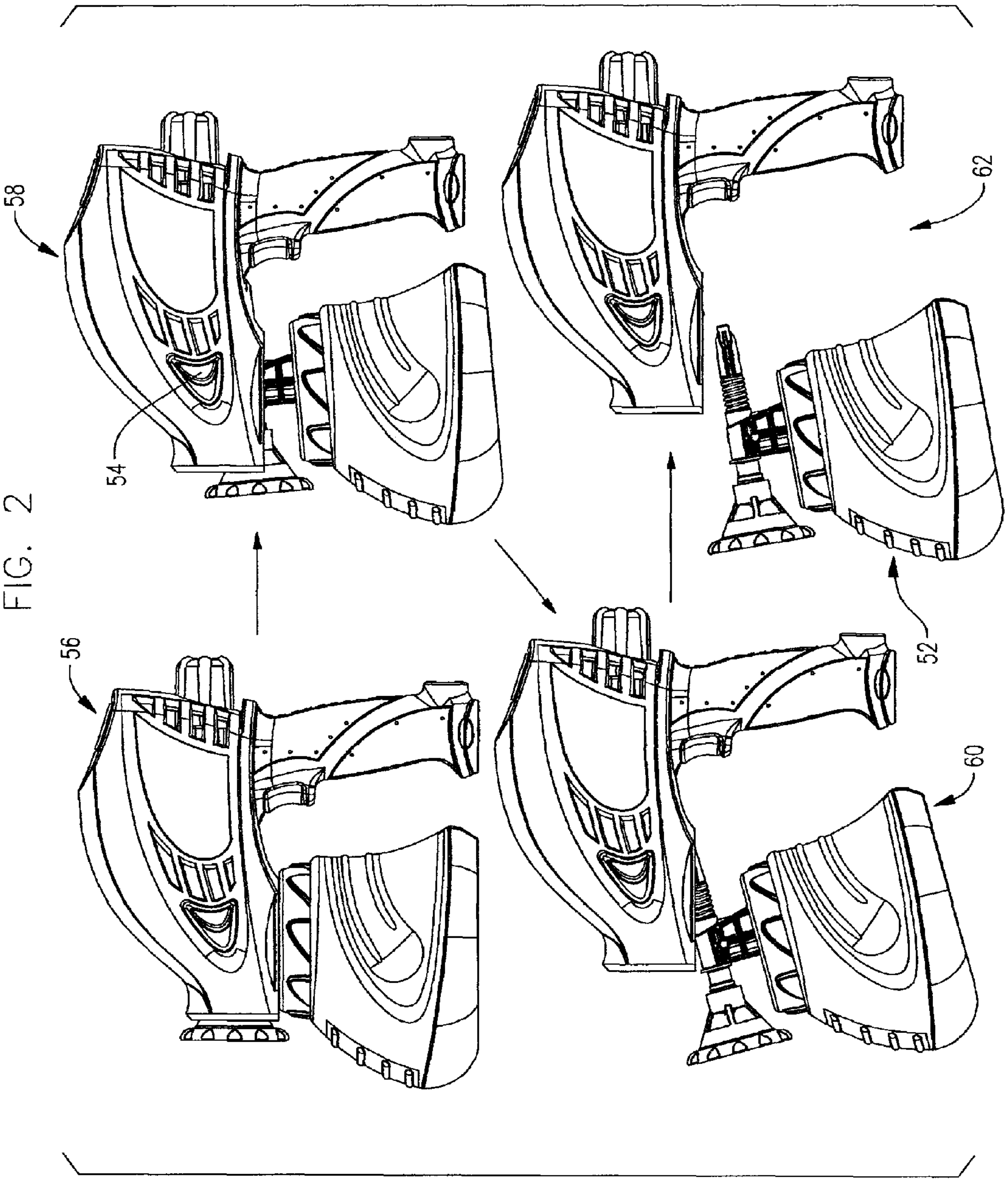
FIG. 2 shows the paint spray gun of FIG. 1 in a sequence of positions as the wetted parts subassembly is removed from the remainder of the gun.

Referring now also to FIG. 2, removal of a wetted parts subassembly 52 from the remainder of the gun 40 is facilitated by the present invention in that a pair of (preferably identical) pushbuttons or operators 54 (one of which is shown in FIGS. 1 and 2) are provided on opposite sides of the gun housing 46 to release the wetted parts subassembly 52. The gun 40 is shown in a first condition 56 in which the gun is assembled. In a second condition 58, buttons 54 have been depressed, and the wetted parts subassembly 52 is initially released from the remainder of the gun 40. In a third condition, the wetted parts subassembly is moved further out from the remainder of the gun, and in a fourth condition, the wetted parts subassembly 52 is completely removed from the remainder of the gun 40, at which time the wetted parts subassembly 52 may be cleaned or serviced or both. It is to be understood that to reassemble the wetted parts subassembly 52 into the paint spray gun 40, (for example, after cleaning or service, or both) the above steps are reversed, moving from condition 62 to condition 60 to condition 58 and finally to condition 56, except that the pushbutton 54 need not be operated during reassembly.

Figure 3:
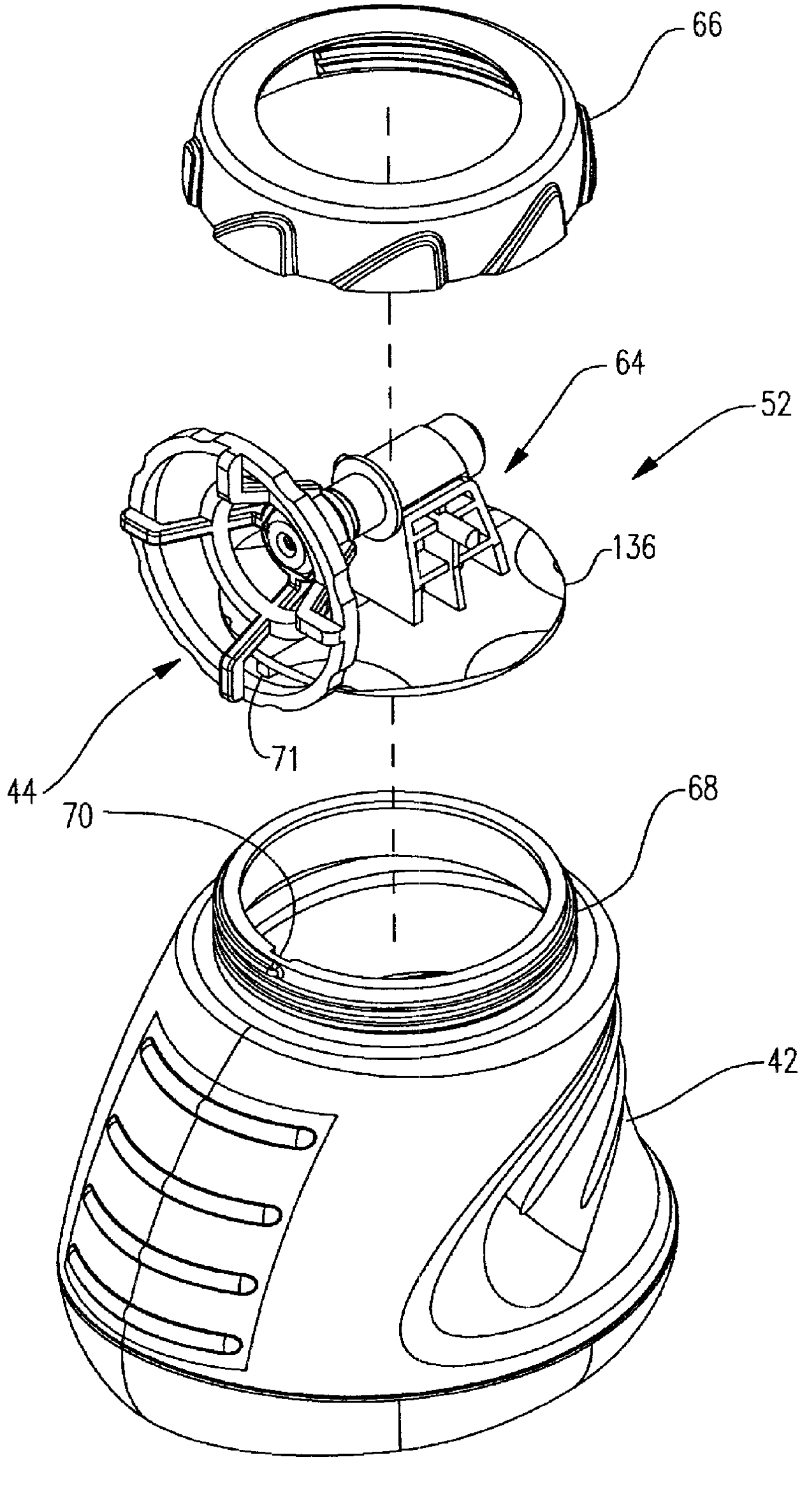
FIG. 3 is an exploded view of the wetted parts subassembly with a siphon tube omitted for clarity.
Figure 4:
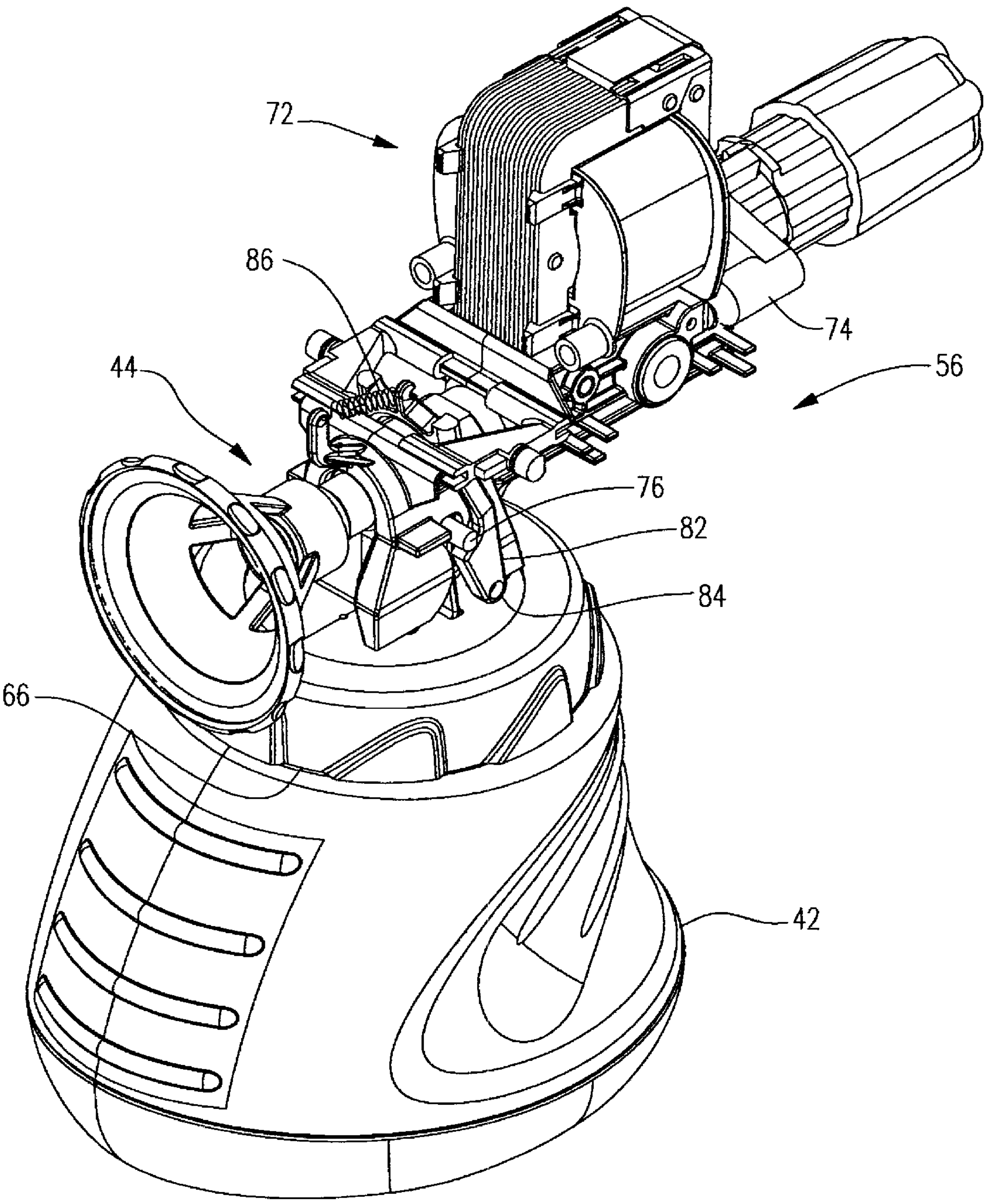
FIG. 4 is a perspective view of the paint spray gun of FIG. 1, except with a gun housing and trigger removed to illustrate certain aspects of the present invention.
Figure 5:
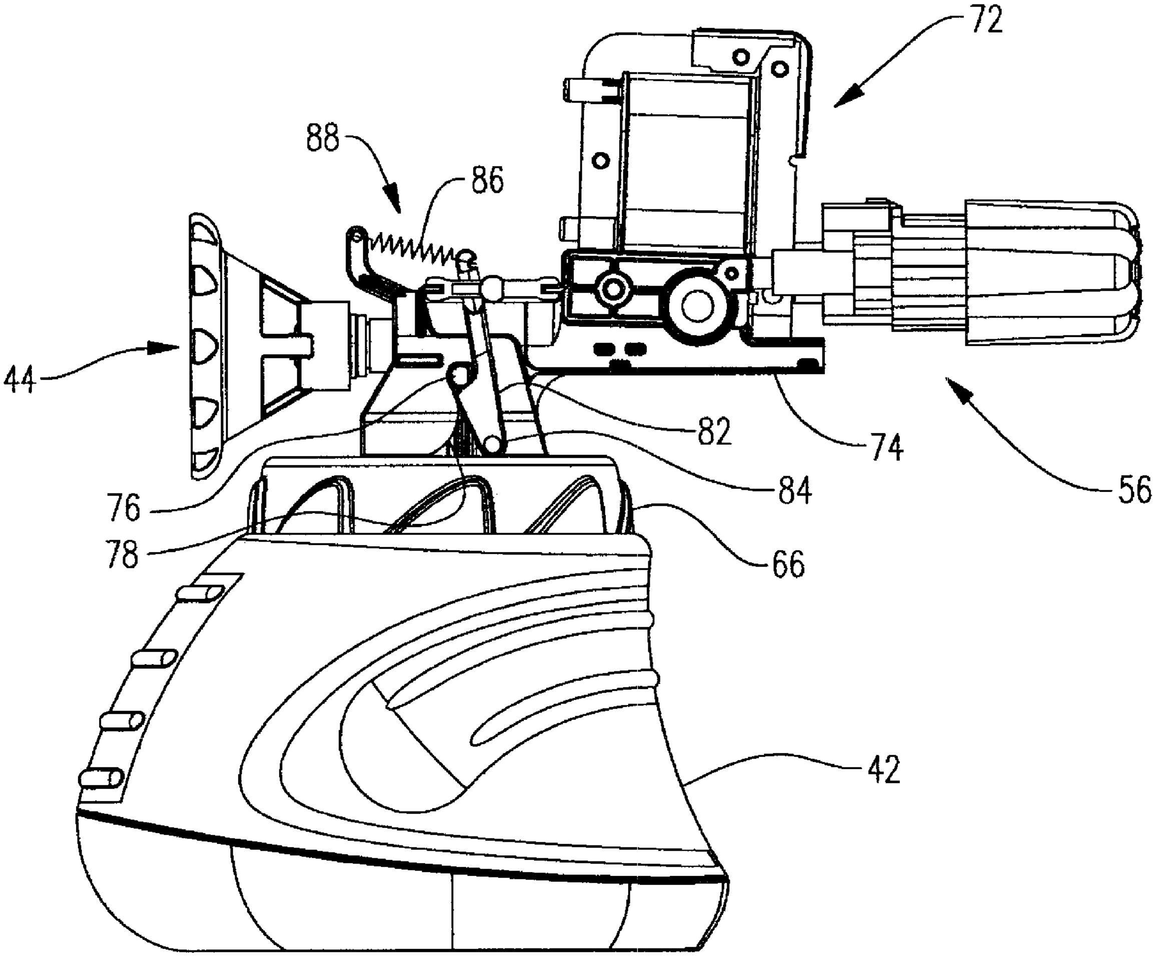
FIG. 5 is a side elevation view similar to that of FIG. 4, with the wetted parts subassembly assembled in a locked position.

Referring now also to FIG. 3, the wetted parts subassembly 52 is shown without a piston and siphon tube which are normally present, but which are omitted for clarity in this view. FIG. 3 illustrates that access to a paint pump housing and cylinder assembly 64 may be achieved by unscrewing a paint cup retaining ring 66 from a set of threads 68 on the paint cup 42. Ring 66 may also be removed by passing it over the top of assembly 64, if desired. A keyway 70 may be provided at the upper rim of the paint cup 42 to engage a mating key 71 on the underside of the assembly 64 to orient the cup 42 properly with respect to the assembly 64 and the gun 40. It is to be understood that the present invention includes the aspect that the ring 66 is separate from the assembly 64, in contrast to the prior art where it was typical to have a downward extending rim with threads formed integrally with a pump housing corresponding to a housing 136 of the assembly 64. In this aspect of the present invention, having the ring 66 separate from the housing 136 allows the ring to rotate and permits positive orientation of the paint cup 42 to the assembly 64, enabling alignment of a non-circularly symmetrical paint cup to the assembly 64, and thus to the paint spray gun 40. This may be accomplished by engagement of the key and keyway structures located on the housing 136 and paint cup 42. Another advantage to having a separate ring 66 is that the paint cup 42 is no longer required to be rotated to be attached or released from the remainder of the gun 40, making it easier and more convenient for a user. It is to be understood to be within the scope of the present invention to have the keyway on housing 136 and the key on paint cup 42, if desired.

Referring now most particularly to FIGS. 4-12, the gun 40 is shown in the various conditions 56, 58, 60 and 62 in these Figures, but without the housing 46 and without the operators 54, to better illustrate the quick disconnect feature of the present invention.

FIGS. 4, 5, 8 and 9 show perspective and side views of the gun in the assembled condition 56. In the first condition 56, the wetted parts subassembly 52 is held to the remainder of the gun 40, including particularly a drive mechanism 72 supported by a drive housing 74. The pump housing and cylinder assembly 64 is secured to the drive housing 74 by a pair of protrusions 76 on the assembly 64 received in slots 78 in the drive housing 74, and retained therein by each of a pair of cam surfaces 80 on a lock lever 82 which is pivotably attached to the drive housing 74 at pivots 84. A spring 86 connected between the drive housing 74 and the lock lever 82 urges the lock lever 82 to a locked position 88 corresponding to condition 56, blocking protrusions 76 from moving out of slots 78. The protrusions 76 may be cylindrical, or trunnion-like.

Figure 10:
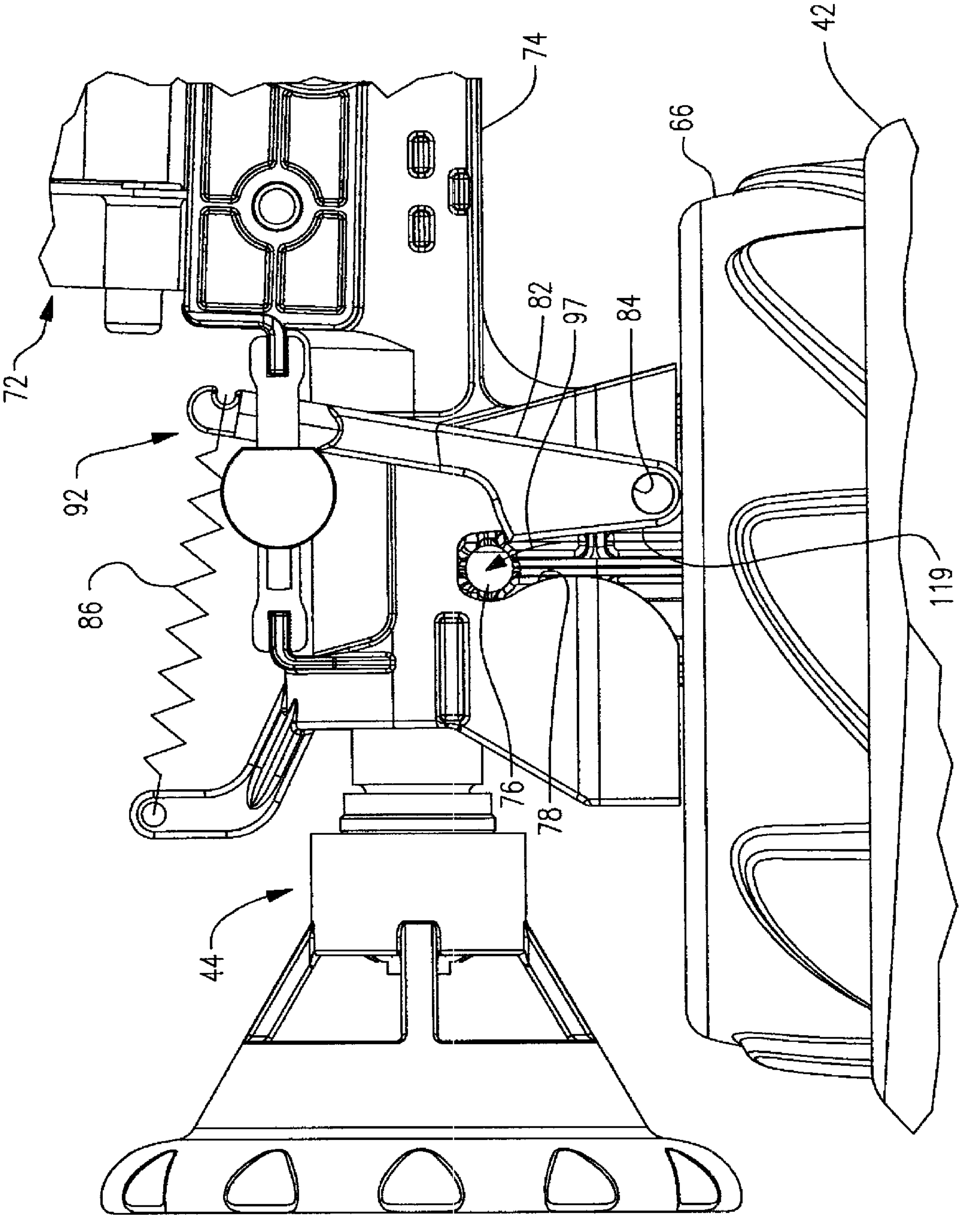
FIG. 10 is an enlarged fragmentary side view similar to that of FIG. 9, except with the locking mechanism in an unlocked condition.

FIG. 10 shows a side view a portion of the gun 40 in a released condition after one or both operators 54 is pressed, and before the wetted parts subassembly 52 moves with respect to the remainder of the gun 40. In this condition (which would appear to be the same as that shown for the first condition 56 in FIG. 2), the subassembly 52 is released, but not separated from the remainder of the gun 40. Protrusions 76 remain in slots 78, but are free to move out of the slots, because lock lever 82 has been moved from the locked position 90 to a release position 92. In the release position 92, cam surface 80 is moved out of the way and no longer blocks protrusions 76 from exiting slots 78. It is to be understood that this condition and the release position 92 for lock lever 82 will continue only for as long as at least one operator 54 is depressed, illustrated in FIGS. 6, 7 and 11. Once both operators 54 are released, spring 86 will return the lock lever to the locked position 88, as shown in FIG. 12. In FIG. 10, the lock lever 82 may be seen to have a drive surface 119 facing the protrusion 76 when the wetted parts subassembly 52 is reinstalled in the gun 40 as protrusion 76 moves through slot 78 in the direction of arrow 97. The protrusion 76 moves the lock lever or arm 82 temporarily out of the way of the protrusion 76 to allow reassembly of the wetted parts subassembly 52 to the gun 40.

Figure 6:
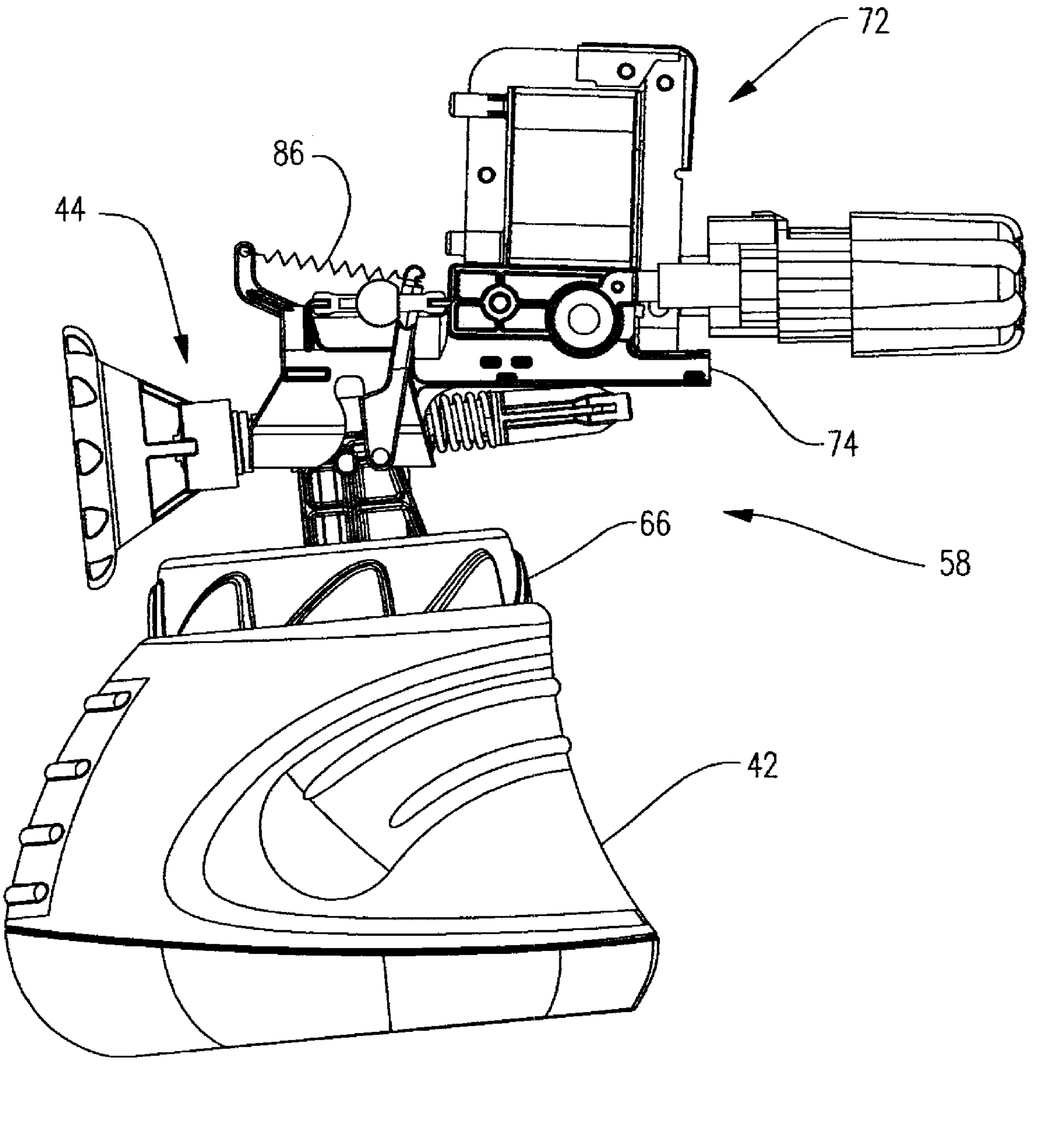
FIG. 6 is a side elevation view similar to that of FIG. 5, except with the wetted parts subassembly unlocked and partially released.
Figure 11:
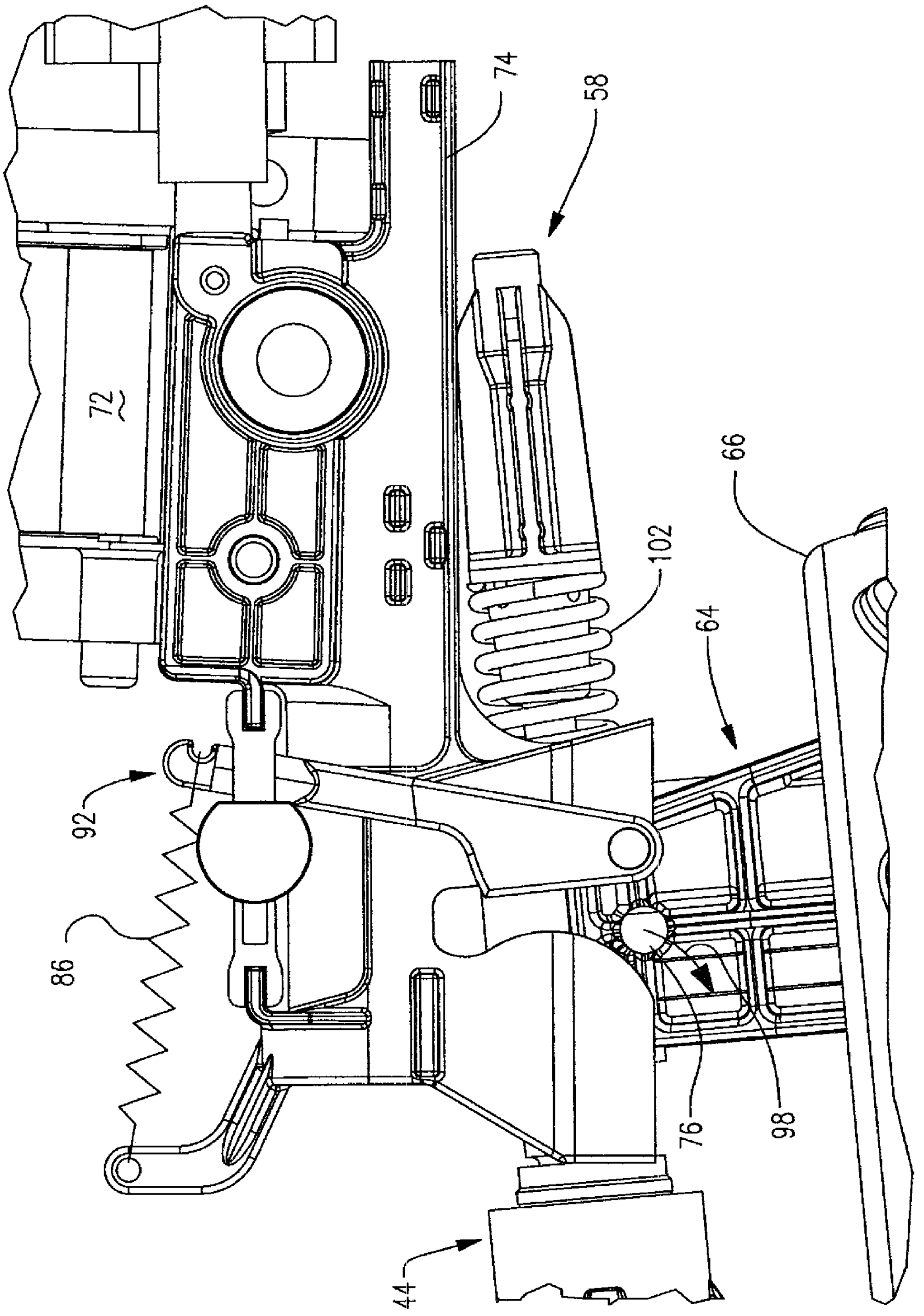
FIG. 11 is an enlarged fragmentary side view similar to that of FIG. 10, except with the locking mechanism in an unlocked and partially disassembled condition.
Figure 12:
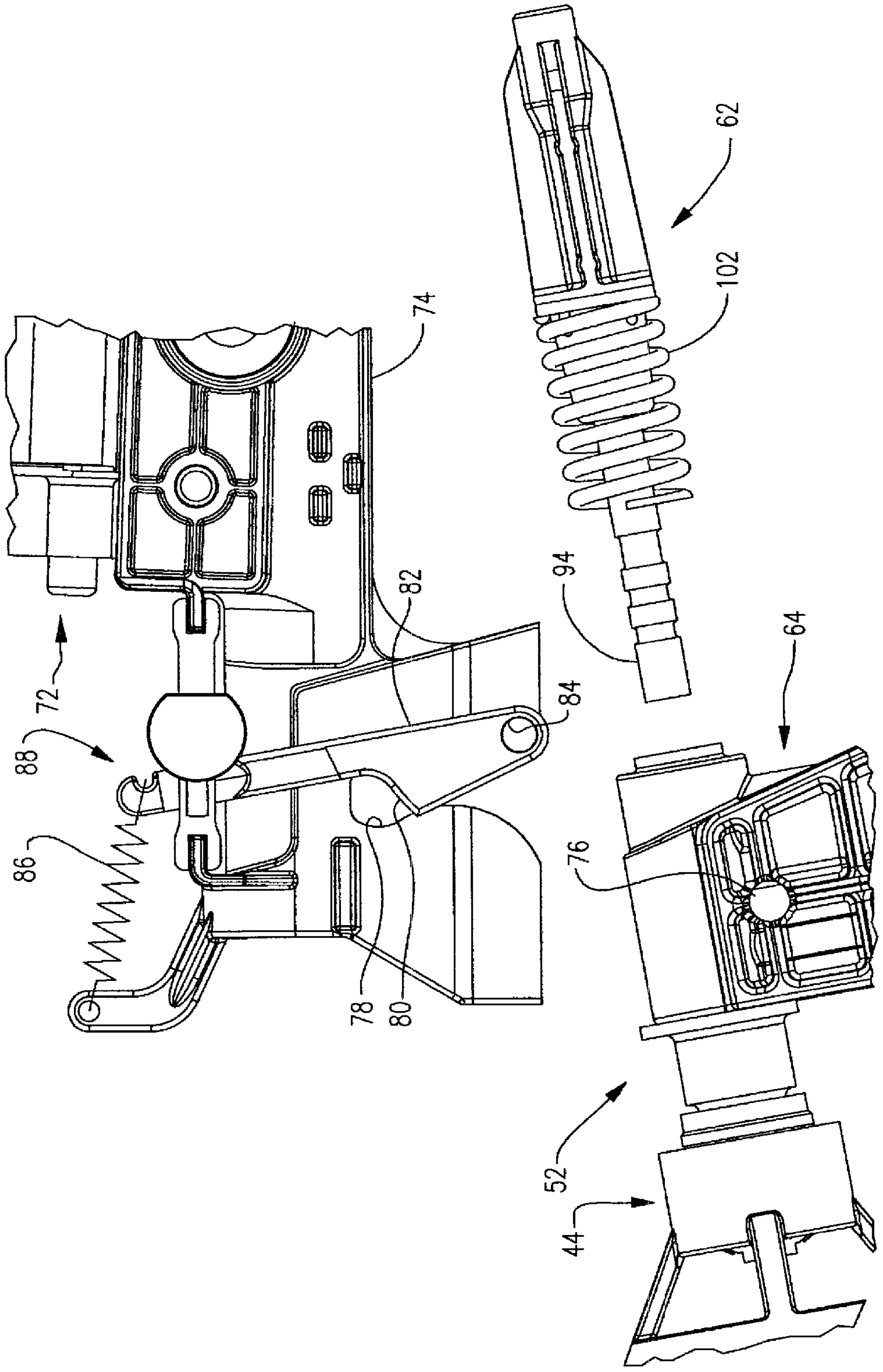
FIG. 12 is an enlarged fragmentary perspective view of a portion of FIG. 7, showing the wetted parts subassembly in a fully separated condition.
Figure 13:
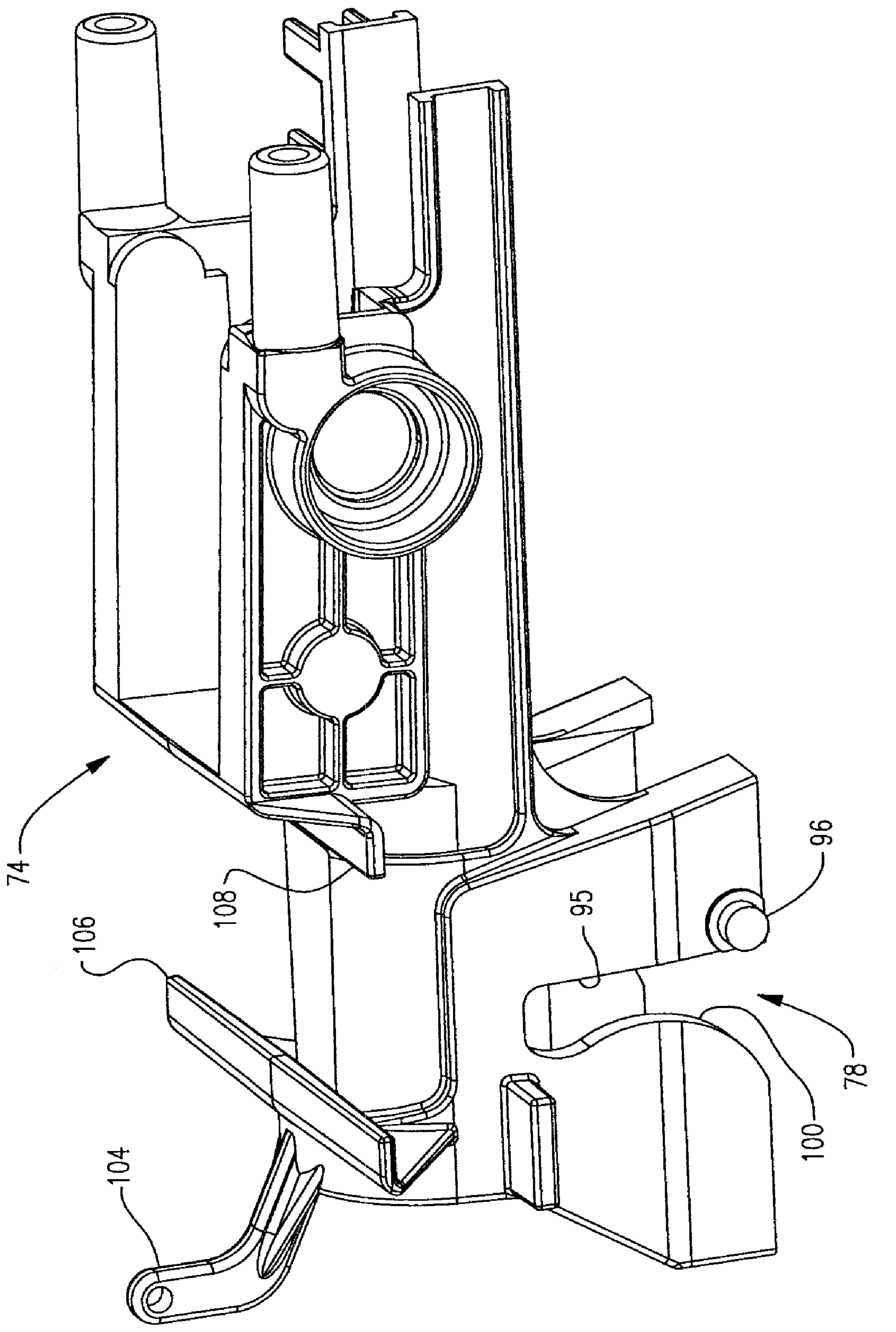
FIG. 13 is a perspective view of a drive housing useful in the practice of the present invention.
Figure 14:
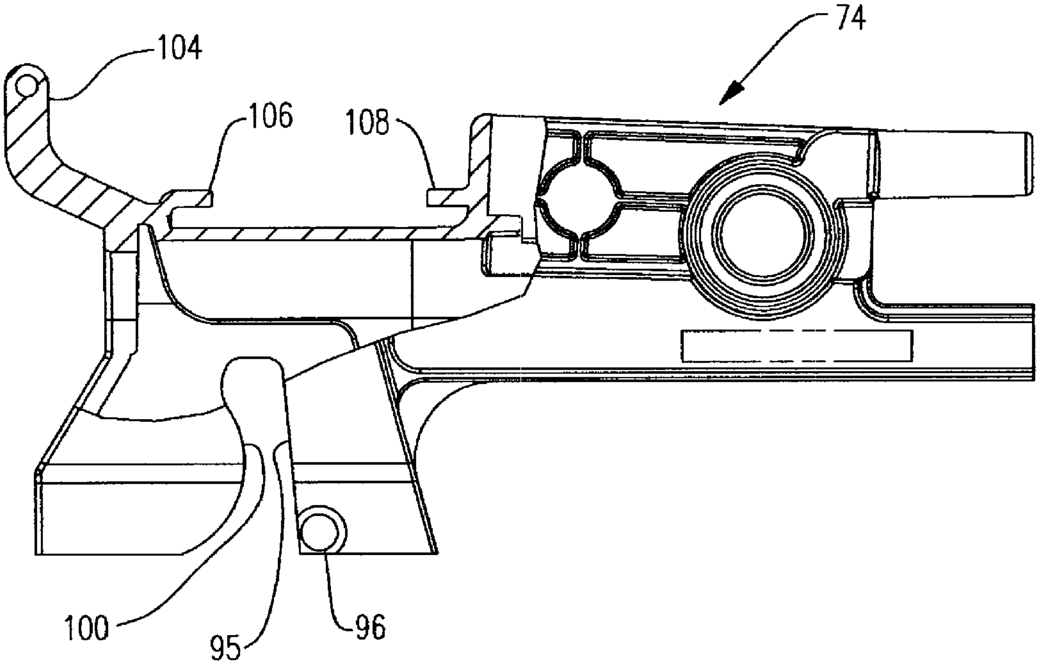
FIG. 14 is a side elevation view of the drive housing of FIG. 13.
Figure 15:
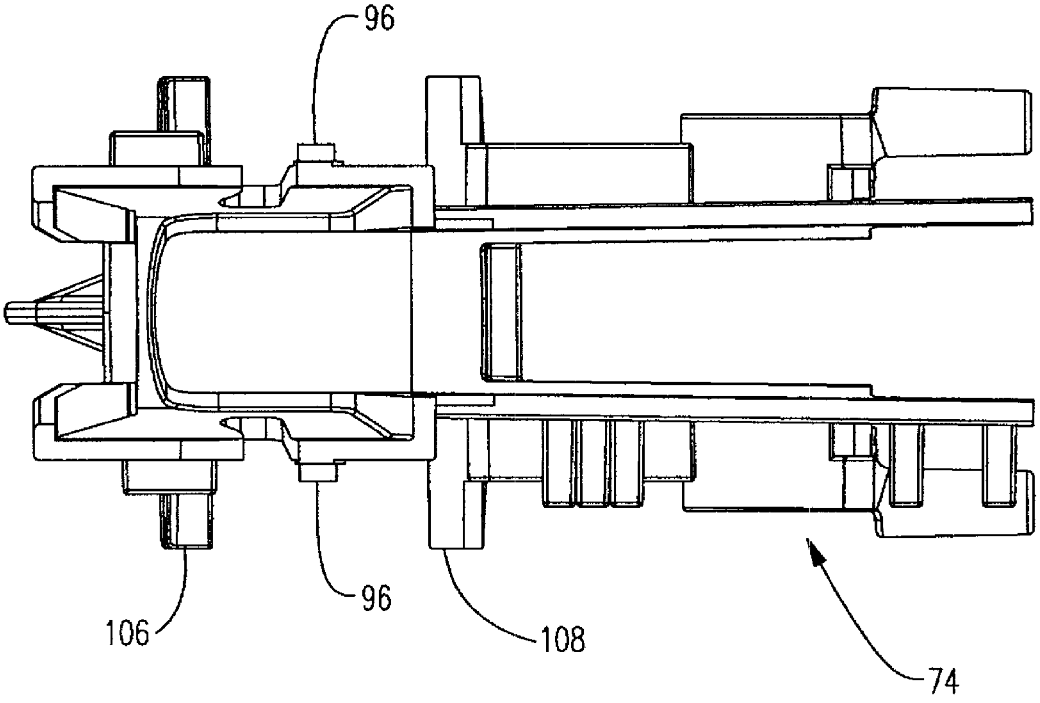
FIG. 15 is a bottom plan view of the drive housing of FIG. 13.
Figure 16:
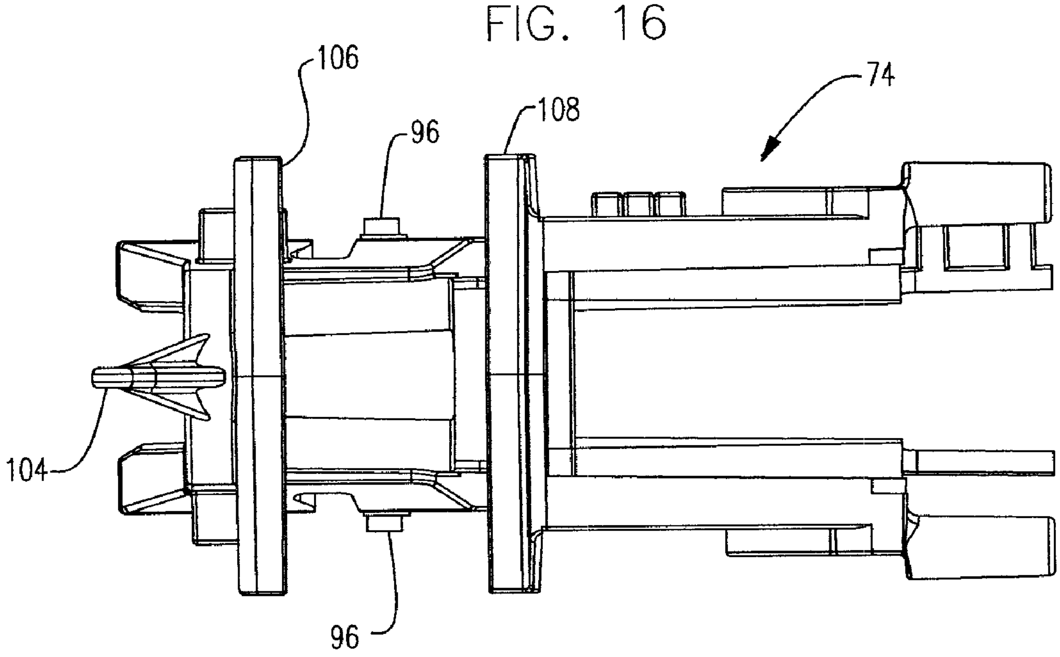
FIG. 16 is a top plan view of the drive housing of FIG. 13.

Referring now most particularly to FIGS. 6 and 11, the gun 40 is shown in the released and partially disassembled second condition 58. In this condition, the wetted parts subassembly 52 is moved partially away from the remainder of the gun by moving the protrusions 76 out of slots 78 in the drive housing 74.

Figure 7:
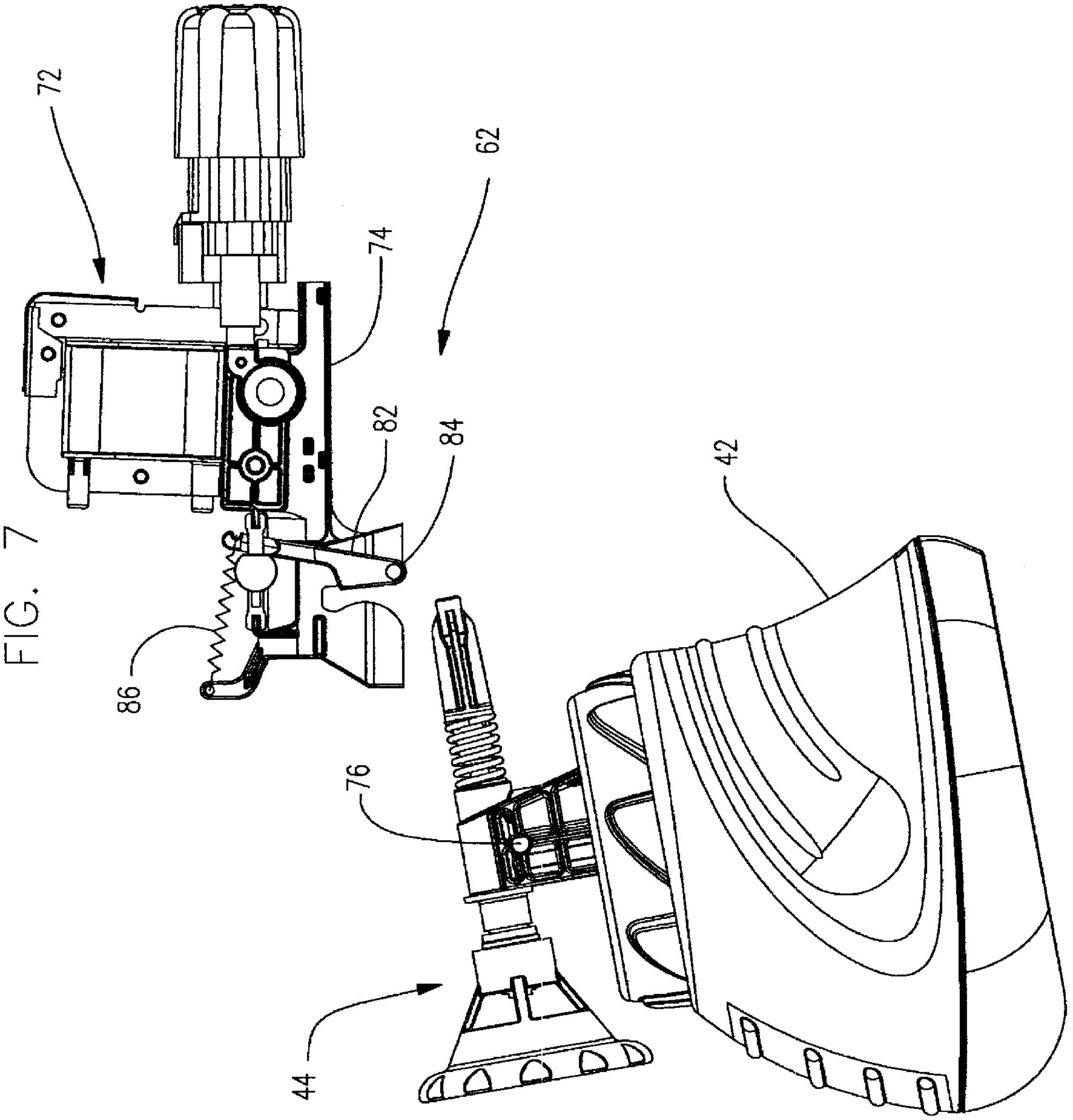
FIG. 7 is a side elevation view similar to that of FIG. 6, except with the wetted parts subassembly fully released.

Referring now to FIGS. 7 and 12, the gun 40 is shown in condition 62 with the wetted parts subassembly 52 completely separated from the remainder of the gun 40. In this condition, the wetted parts subassembly 52 may itself be disassembled and serviced separately and apart from the electrical parts of the gun 40. In FIG. 7, a piston 94 is shown installed in the wetted parts subassembly 52, while in FIG. 12, the piston 94 is shown removed from the remainder of the wetted parts subassembly 52, it being understood that the piston 94 can be removed for cleaning or replacement simply by manually withdrawing it from the pump housing and cylinder subassembly 64. FIG. 12 also differs from FIG. 7 in that the lock lever 82 is shown in the release position 92 in FIG. 7 and in the locked position 88 in FIG. 12.

Referring now to FIGS. 13-18, various views of the drive housing 74 may be seen. Housing 74 has a pair of bosses 96 each of which is located adjacent one of the slots 78 to serve as pivots 84 for the lock lever 82. Each slot 78 has one relatively straight side 95 and an opposing generally S-curved side 100. Having the S-curved side 100 enables the drive housing to positively retain the wetted parts subassembly 52 in a fully seated relationship in the drive housing 74 when the protrusions 76 are urged against the lock lever 82 during installation of the assembly 52 and moved into the slots 78. The S-curve also provides an over-center function to fully seat the subassembly 52 upon installation (indicated by arrow 97 in FIG. 10) and to direct the subassembly 52 to the free condition 62 (upon disassembly) once it reaches the second condition 58 (shown in FIG. 11 and indicated by arrow 98). A piston return spring 102 (shown in FIG. 12) urges the protrusions 76 towards the S-curved side of the slots 78.

Figure 8:
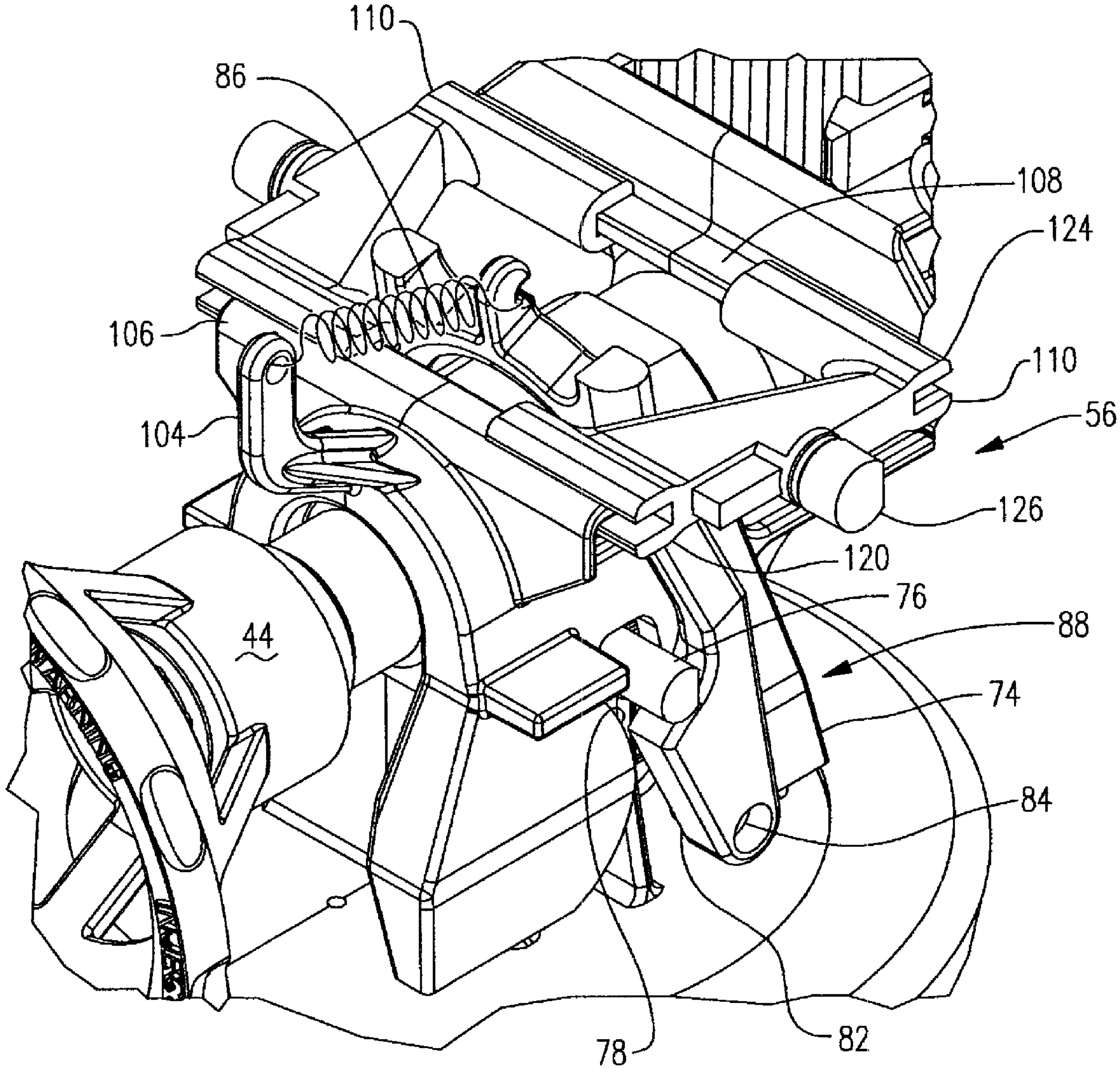
FIG. 8 is an enlarged fragmentary perspective view of a portion of FIG. 4, showing the locking mechanism in an assembled and locked condition.
Figure 9:
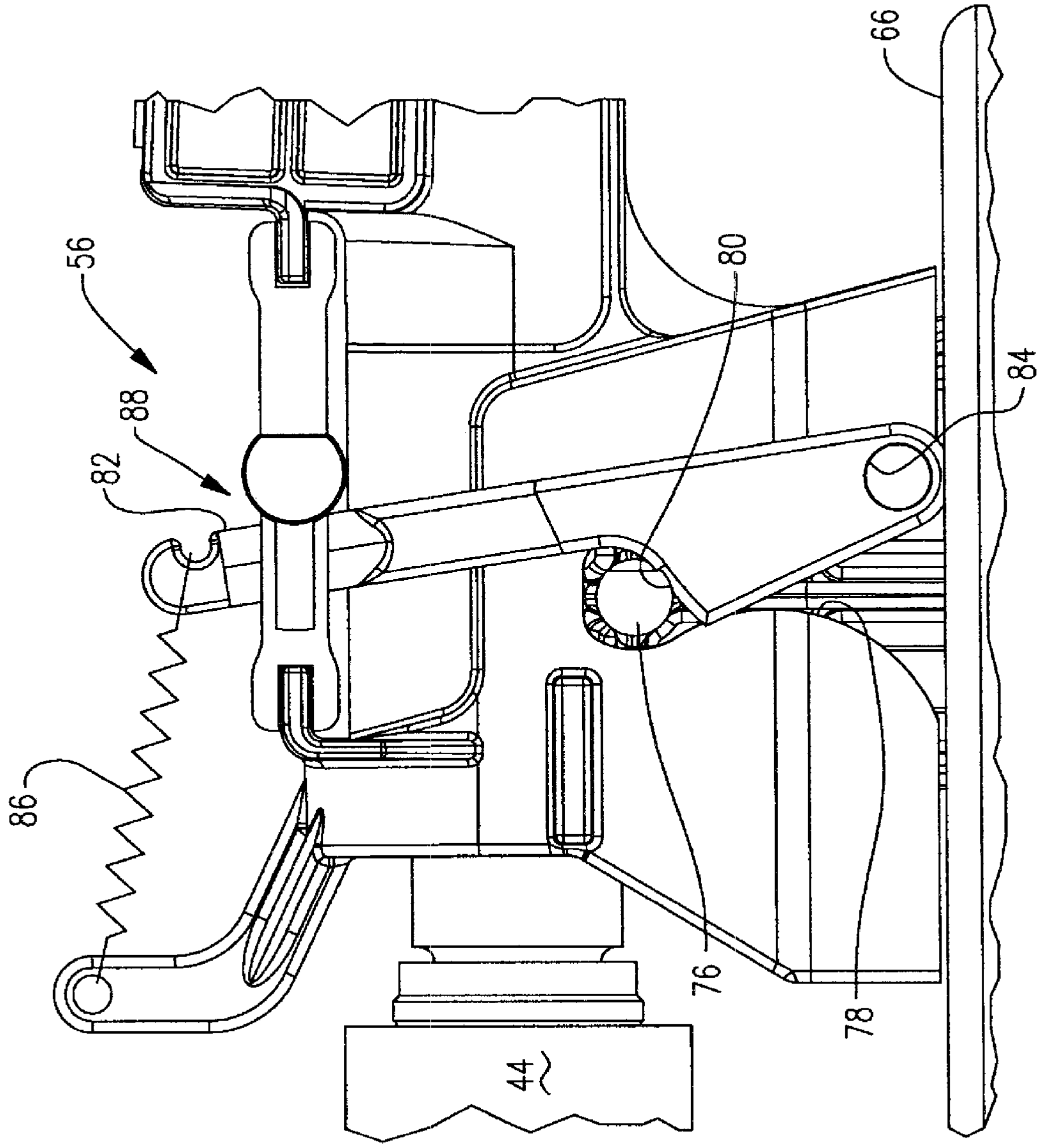
FIG. 9 is an enlarged fragmentary side view of a portion of FIG. 5, showing the locking mechanism in the assembled and locked condition.

Drive housing 74 also has an upstanding arm 104 for spring 86, and a pair of transverse tracks 106, 108 for receiving and guiding a pair of slide actuators 110 (shown in FIG. 8).

Referring now to FIGS. 19-23, the lock lever 82 may be seen in various views. Lock lever 82 is generally U-shaped and may have a pair of apertures 112 sized and positioned to be received over bosses 96, such that lever 82 will be free to rotate about pivots 84. Lever 82 may also have a centrally located extension 114 for engagement with spring 86. Lever 82 also preferably has a pair of rounded shoulders 116 located to engage respective mating surfaces 118 on the slide actuators 110.

Referring now to FIGS. 24-30, the slide actuator 110 may be seen. It is to be understood that preferably a pair of identical slide actuators may be used in the practice of the present invention, although only one is necessary. Slide actuator 110 may have a pair of C-shaped end flanges 120, 124 sized and spaced to respectively mate with the transverse tracks 106 and 108 on the drive housing 74, as may be seen in FIGS. 8 and 9. Actuator 110 may also have a projection 128 shaped and sized to mate with operator 54. Projection 128 may have a circumferential groove 130 to receive a mating circumferential projection on operator 54 to retain the operator 54 to the sliding actuator 110. Projection 128 may also have a flat 128 cooperating with a similar surface on the operator 54 to maintain angular alignment between the operator 54 and actuator 110.

Referring now to FIGS. 31-37, the paint pump housing and cylinder assembly 64 may be seen in more detail. A metal cylinder 132 and carbide liner 134 may preferably be molded in a polymer housing 136. The cylinder may be made of aluminum and the housing 136 may be molded of an acetal copolymer. Protrusions 76 are preferably integrally molded with housing 136. Key 71 is preferably a tooth shaped structure molded integrally with housing 136 and may have a gusset or support 138 molded integrally therewith.

Figure 50:
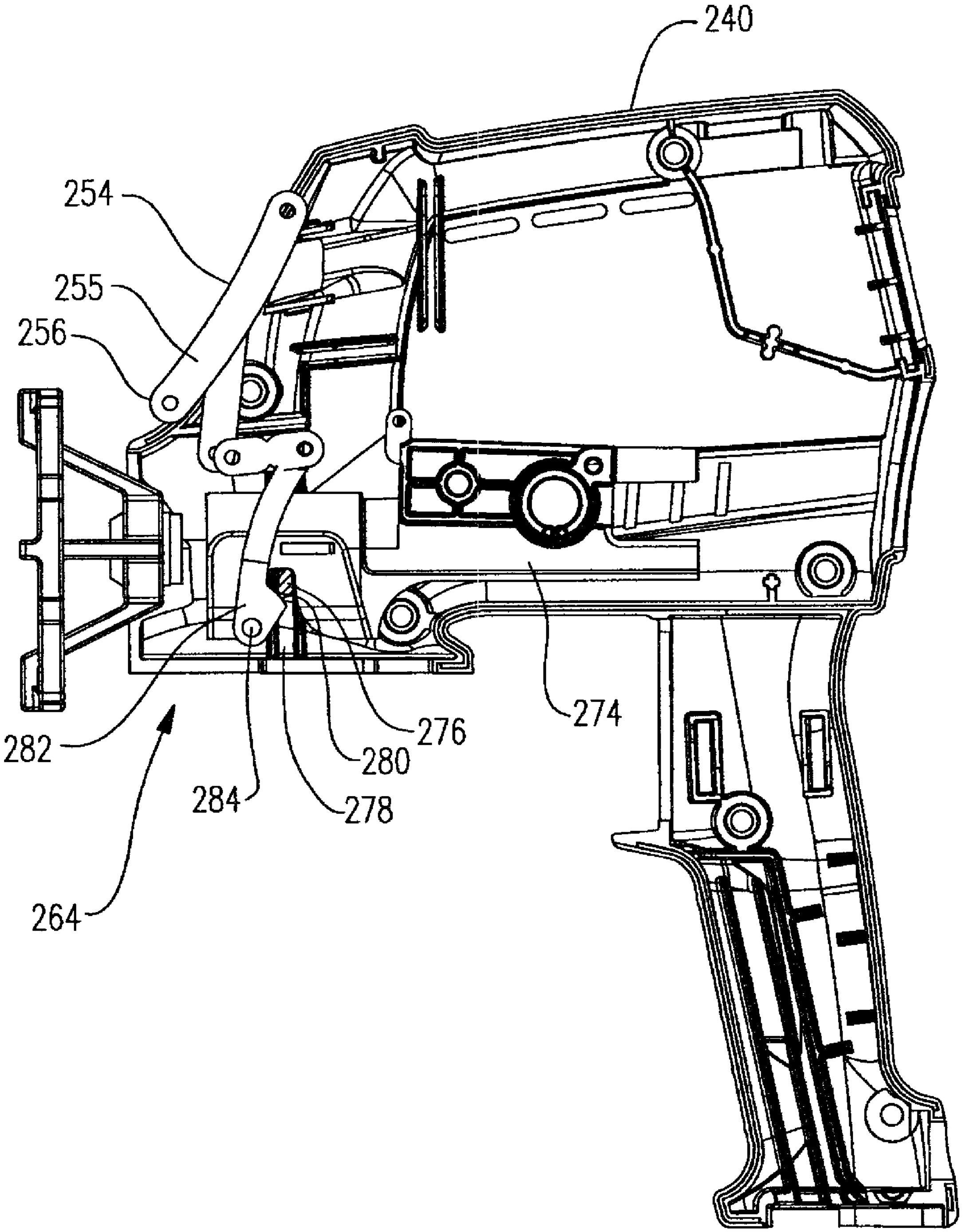
FIG. 50 is partial side view of a first alternative embodiment of a paint spray gun having a latch mechanism shown in a latched position.
Figure 51:
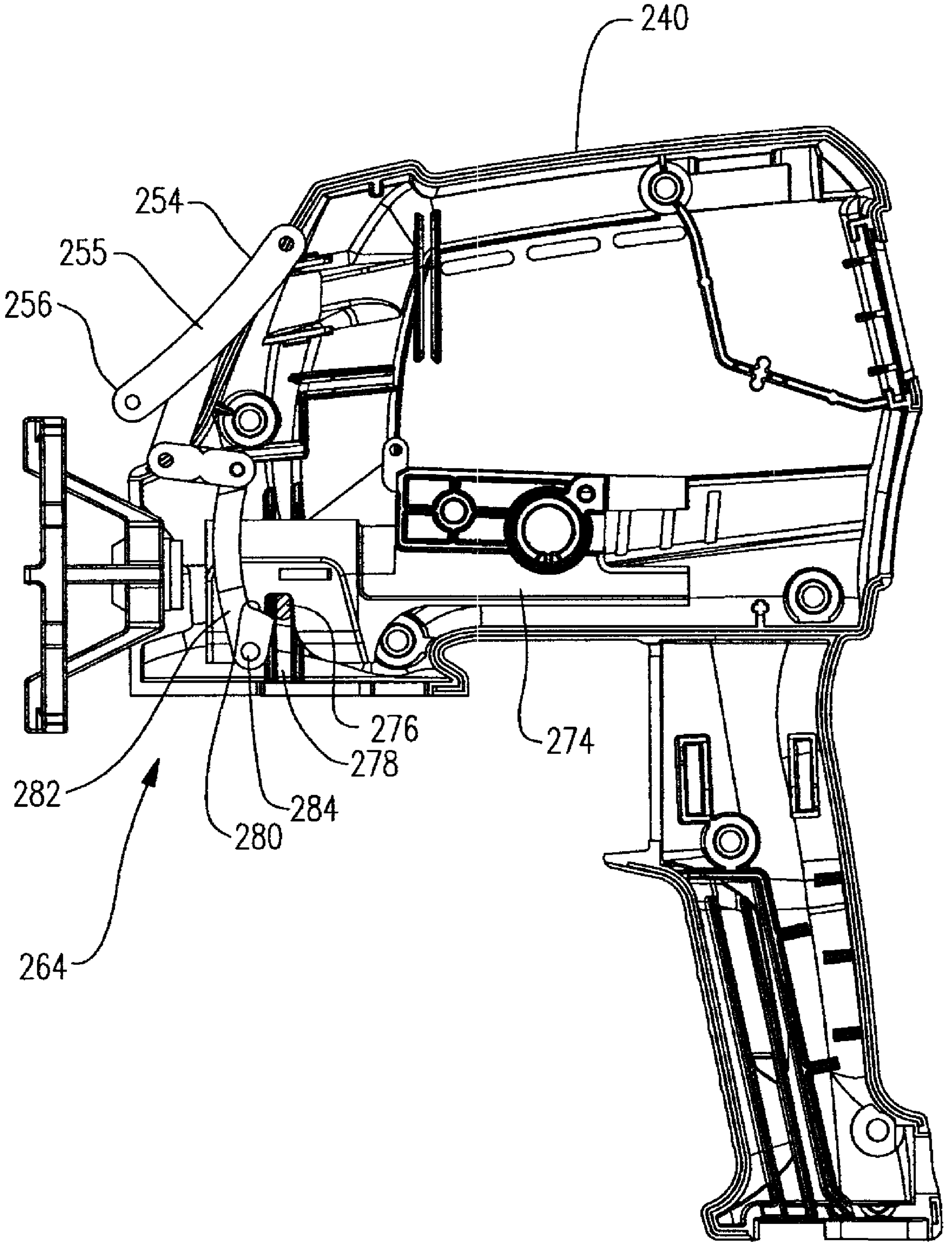
FIG. 51 is a partial side view of the paint spray gun in FIG. 50, showing the latch mechanism in an unlatched position.

Referring now to FIGS. 50-54, additional embodiments of a quick disconnect apparatus of the wetted parts subassembly are shown. In FIGS. 50-51, a portion of a paint gun 240, similar to paint gun 40 described above, is shown including a drive housing 274 and a paint pump housing and cylinder assembly 264 (partially shown). The drive housing 274 includes slots 278 configured to receive protrusions 276 on the paint pump housing and cylinder assembly 264. In this embodiment, a lock lever 282 having a cam surface 280 and a pivot 284 is provided and configured to move between a locked or latched position in which the protrusions 276 are retained within slots 278 and an unlocked or unlatched position in which the protrusions 276 are free to move out of the slots 278. A spring 286 is also connected between the lock lever 282 and the drive housing 274 in order to urge the lock lever 282 into the latched position.

In this embodiment, instead of pushbuttons, a latch mechanism 254 is provided to operate the quick disconnect apparatus, including a pair of links 255 pivotally mounted to the lock lever 282 and the drive housing 274 and having a free end 256. In the latched position shown in FIG. 50, the latch mechanism 254 is in a first, downward position and is retained in this position by the spring 286. In FIG. 51, the unlatched position is shown with the latch mechanism 254 in a second, upward position that extends the spring 286 by upward lifting of the link free end 256. Upon release of the link 255 and latch mechanism 254 at the free end 256, the spring 286 urges the latch mechanism 254 to the first position and urges the lock lever 282 to the latched position.

Figure 52:
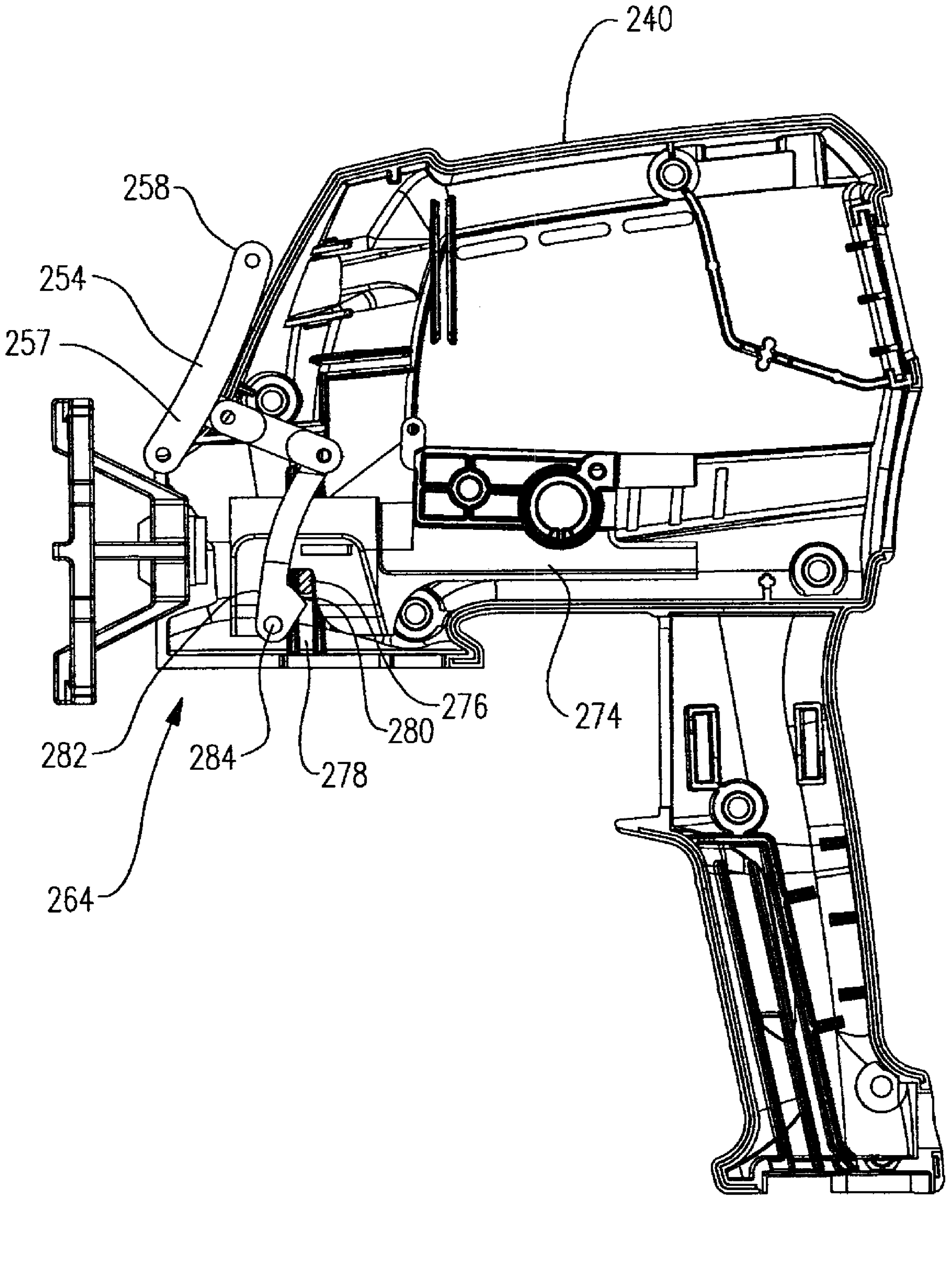
FIG. 52 is partial side view of a second alternative embodiment of a paint spray gun having a latch mechanism shown in a latched position.
Figure 53:
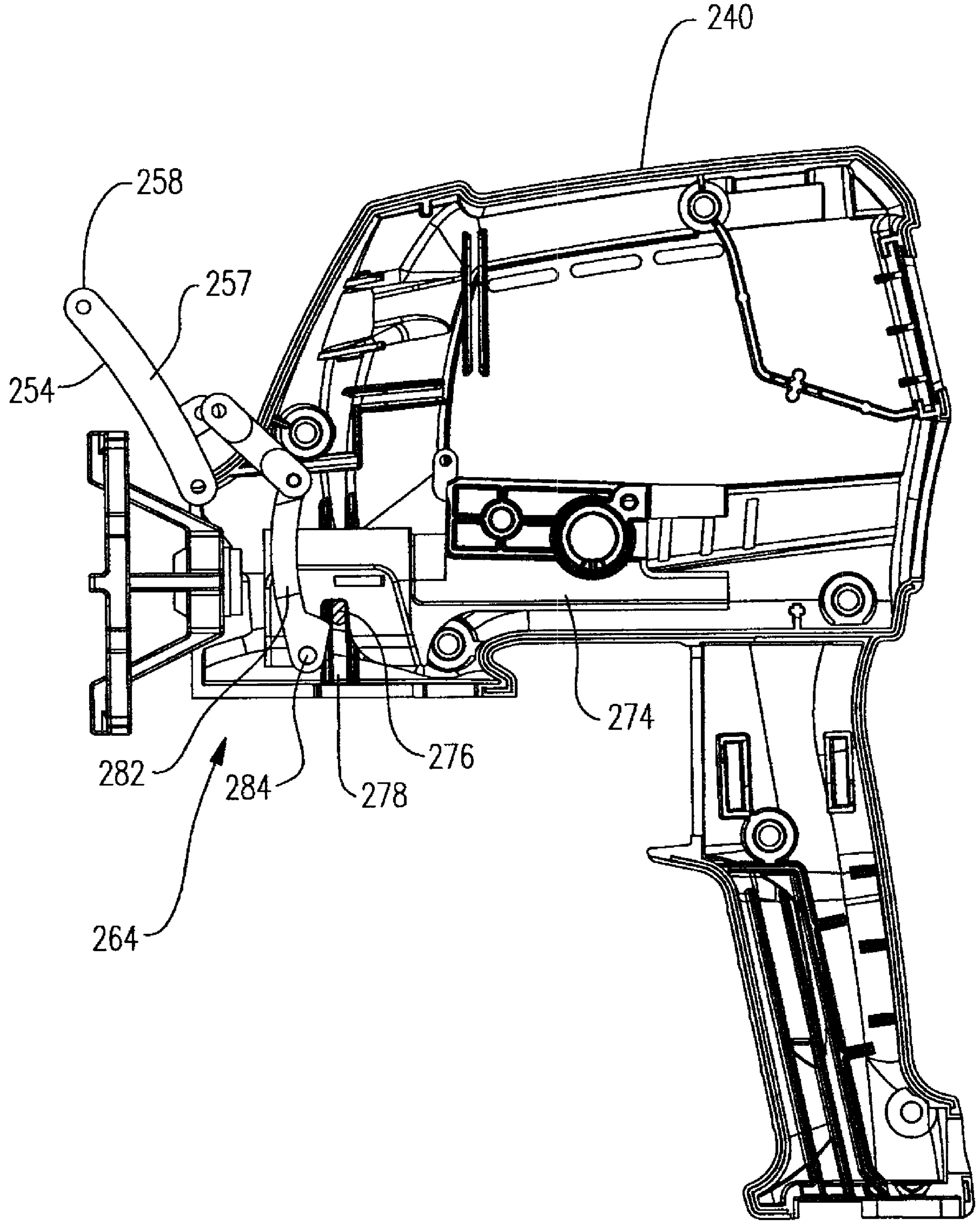
FIG. 53 is a partial side view of the paint spray gun in FIG. 52, showing the latch mechanism in an unlatched position.

In FIGS. 52-53, a second alternative embodiment of a paint spray gun 240 is shown having the same components as described above. In this embodiment, however, the latch mechanism 254 is shown including a pair of linkages 257 having a free end 258. The pair of links 257 is pivotally coupled to the lock lever 282 and attached to the spring 286.

FIG. 52 shows the latch mechanism 254 in the first, latched position, similar to FIG. 50. FIG. 53 shows the latch mechanism 254 in the second, unlatched position, wherein the free end 258 of the linkages 257 has been moved downward and outward away from the drive housing 274, extending the spring 286. Upon release of the linkage free end 258, the spring 286 urges the latch mechanism 254 to the first position and urges the lock lever 282 to the latched position.

Figure 54:
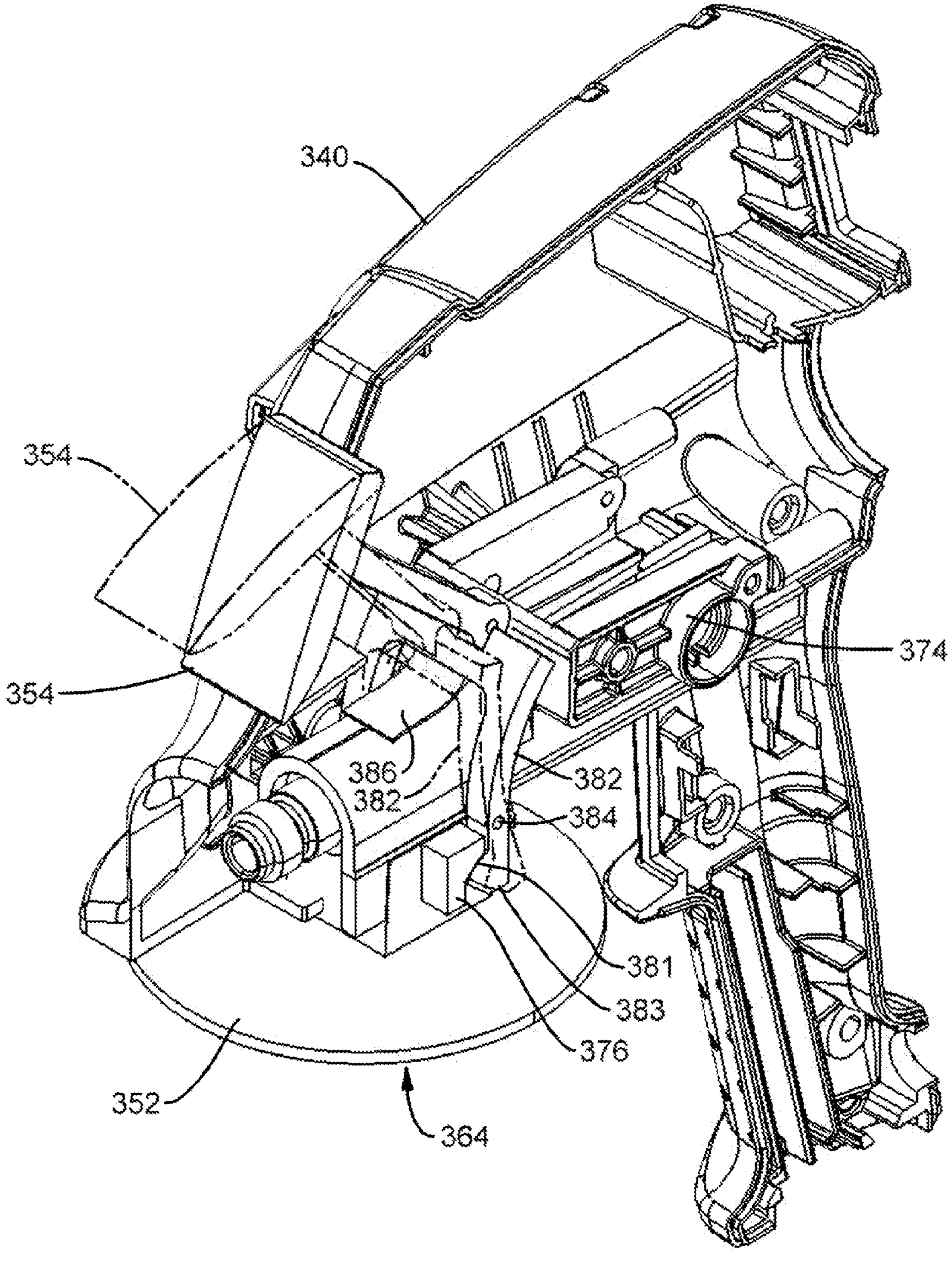
FIG. 54 is a partial perspective view of a third alternative embodiment of a paint spray gun having a latch mechanism shown in the latched position in solid lines and in an unlatched position in dashed lines.

Referring now to FIG. 54, a partial view of a third alternative embodiment of the quick disconnect apparatus 340 is shown including a wetted parts subassembly 352 having a paint pump housing and cylinder assembly 364 (partially shown) and a drive housing 374. In this embodiment, the pump housing and cylinder assembly 364 is secured to the drive housing 374 by a pair of notched posts 376, instead of protrusions fitting into slots, such as in the previous embodiments. A lock lever 382 is pivotally attached to the drive housing 374 at pivots 384. The lock lever 382 includes barbed ends 383 having cam surfaces 381 configured to mate with notched posts 376.

A latch 354 is provided to operate the lock lever 382, such as through a coupling member 355. In a first or latched position of the latch 354, shown in solid lines, the barbed ends 383 of the lock lever 382 engage the notched posts 376 mounted to the pump housing and cylinder assembly 364 so as to retain the pump housing and cylinder assembly 364 within the pump gun 340. In a second or unlatched position, shown in dashed lines, the latch 354 is moved upward, away from the drive housing 374, causing the lock lever 382 to rotate about the pivots 384. As a result, the barbed ends 383 disengage from the notched posts 376 allowing the pump housing and cylinder assembly 364 and wetted parts subassembly 352 to be removed from the paint gun 340 for cleaning. A spring 386 is provided, coupled to the lock lever 382, to urge the lock lever 382 and thus the latch 354 into the first or latched position.

In one aspect, the invention may thus be seen to be an apparatus for quick disconnect of the wetted parts subassembly 52 from the paint spray gun 40. The wetted parts subassembly may include the spray tip or nozzle 44, the pump cylinder 132 and carbide liner 134, the piston 94 and paint cup 42 and associated components (such as a suction tube and strainer, not shown but conventional). In particular, the apparatus for quickly disconnecting wetted parts may include a pump housing and cylinder assembly 64 carrying the pump cylinder and having at least one and preferably a pair of protrusions 76, and a drive housing 74 having at least one and preferably a pair of slots 78 aligned to receive the protrusions(s) 76 when the pump housing and cylinder assembly 64 is received in the housing 74. The invention may also include a lock lever 82 pivotably attached to the drive housing 74 adjacent at least one of the slots 78 and movable between a latched position wherein the pump housing cylinder support 64 is retained to the drive housing 74, and an unlatched position wherein the pump housing cylinder support 64 is removable from the drive housing 74.

The locking lever 82 may be generally U shaped and is preferably pivotably attached to the frame 74 adjacent each of the slots 78. A spring 86 provides means for urging the lock lever 82 towards the latched position. The lock lever 82 has a cam surface 80 in an overlapping relationship with the slot 78 when the lock lever 82 is in the latched position. The cam surface 80 is moved out of the overlapping relationship with the slot 78 when the pump housing and cylinder assembly 64 is moved from a released position to a retained position wherein each protrusion 76 is received in its respective slot 78. The cam surface 80 of the lock lever 82 blocks the protrusion 76 from retracting out of the slot 78 when the lock lever 82 is in the latched position. The cam surface 80 of the lock lever 82 may be moved clear of the protrusion 76 when the lock lever 82 is in the unlatched position. Each slot 78 preferably has an open proximal end and a closed distal end. A width of the closed distal end of each slot 78 is greater than a minimum width of the slot 78 located intermediate the proximal and distal ends. Each slot 78 has one generally straight side. A width of the open proximal end of each slot 78 may be greater than the minimum width of slot 78.

Alternatively, the present invention may include an apparatus for quickly disconnecting wetted parts may include a pump housing and cylinder assembly 364 carrying the pump cylinder and having at least one and preferably a pair of notched posts 376, and a drive housing 374 including a lock lever 382 pivotably attached to the housing or frame 374 and having barbed ends 383 with cam surfaces 381 configured to mate with the notched posts 376 in the latched position. The lock lever 382 movable between a latched position wherein the pump housing cylinder support 364 is retained to the frame 374, and an unlatched position wherein the pump housing cylinder support 364 is removable from the frame 374.

In another aspect, the present invention may include a method of selectively retaining and quickly disconnecting the wetted parts subassembly 52 with respect to the paint spray gun 40, where the method may include the steps of providing a pump housing and cylinder assembly 64 carrying a pump cylinder 132 and liner 134 and having at least one and preferably a pair of protrusions 76, providing a frame or drive housing 74 having at least one and preferably a pair of slots 78 aligned to receive the protrusions(s) 76 when the pump housing and cylinder assembly 64 is received in the frame 74, pivotably attaching a lock lever 82 to the frame 74 adjacent at least one of the slots 78, moving the lock lever 82 between a latched position wherein the pump housing and cylinder assembly 64 is retained to the frame 74, and an unlatched position wherein the pump housing and cylinder assembly 64 is allowed to be removed from the frame 74, and disconnecting the pump housing and cylinder assembly 64 from the frame 74. The method may further include moving at least one button 54 or a latch mechanism 254 to move the lock lever 82 from the latched position to the unlatched position. Preferably the method may include moving a pair of buttons 54 to move the lock lever 82 from the latched position to the unlatched position.

In another aspect, the invention may include a quick disconnect mechanism for a paint spray gun having a pump housing 64 having at least one protrusion 76, a drive housing 74 having at least one slot 78 for receiving the at least one protrusion 76 and having an arm 82 pivotably mounted on the drive housing 74, the arm 82 having a cam surface 80 moveable into and out of engagement with the at least one protrusions 76, and at least one pushbutton 54 or latch mechanism 254 accessible to a user and operable to pivot the arm 82 such that the cam surface 80 is moved out of engagement with the at least one protrusion 76 to release the pump housing 64 from the drive housing 74. In this aspect, the at least one pushbutton 54 may be movable along a pushbutton axis, and the mechanism may also include at least one slide actuator 110 located between the pushbutton 54 and the arm 82 and movable generally in line with the pushbutton axis wherein a sliding contact occurs between the slide actuator 110 and the arm 82 to move the arm generally perpendicularly to the pushbutton axis. The slide actuator 110 may have a ramp surface in contact with the arm 82. The arm 82 may have a drive surface 119 facing the at least one protrusion 76 when the pump housing 64 moves into engagement with the drive housing 74 such that the at least one protrusion 76 moves the arm temporarily out of the way of the at least one protrusion 76 to allow assembly of the pump housing 64 to the drive housing 74.

Stated another way, the invention may be characterized as a retention and release mechanism for retaining and selectively releasing a wetted parts subassembly from a paint spray gun, with the mechanism including at least one pushbutton accessible at the exterior of a paint spray gun and movable along a pushbutton axis; and an arm mounted in the paint spray gun and having a cam surface positionable into and out of engagement with a portion of a wetted parts subassembly, the cam surface being resiliently biased into engagement with the portion of the wetted parts subassembly and selectively movable generally perpendicularly to the pushbutton axis to be out of engagement with the portion of the wetted parts subassembly in response to actuation of the at least one pushbutton; such that the wetted parts subassembly is retained in the paint spray gun by engagement of the cam surface and portion of the wetted parts subassembly when the at least one pushbutton is not actuated, and the wetted parts subassembly is released for removal from the paint spray gun by disengagement of the cam surface and the portion of the wetted parts subassembly when the at least one pushbutton is actuated. In this characterization, at least one slide actuator may be interposed between the at least one pushbutton and the arm and movable generally along the pushbutton axis in response to movement of the at least one pushbutton. The at least one pushbutton may include a pair of pushbuttons.

Referring now most particularly to FIGS. 38-44, various views of the pushbutton or operator 54 may be seen. It is to be understood that the operator 54 shown is only one form of operator useful in the practice of the present invention, and further that it is within the scope of the present invention to have the ability to use various forms and shapes of operators to actuate or operate projections 126, as desired. The operator 54 shown has been designed to blend in with surrounding contours of the housing 46 while performing the function of allowing a user to actuate projection 126 by depressing the associated pushbutton 54. As mentioned supra, two pushbuttons 54 are preferred, although only one is needed for the operation of the present invention. The mating pushbutton is to be understood to preferably be a mirror image of pushbutton 54. As may best be seen in FIGS. 38, 42 and 43, pushbutton 54 may have a generally triangular periphery with three curved sides 140, 142, and 144, and may have a recessed central section 146. A peripheral flange 148 preferably surrounds operator 54 to retain operator 54 within housing 46 when assembled. Operator or pushbutton 54 also preferably has a cavity 150 on its interior side sized and positioned to receive and mate with projection 126, each of which may have a D-shaped cross section to maintain alignment of the operator 54 during assembly of the paint spray gun 40. Cavity 150 preferably has a radially inwardly projecting surface 152 sized and positioned to mate with circumferential groove 130 in projection 126 to provide a detent action when the operator 54 is pressed onto projection 126.

Referring now to FIGS. 45-49, various views of the paint cup retaining ring 66 may be seen. Ring 66 has a radially inwardly directed flange 154 and a cylindrical collar portion 156 carrying interrupted threads 158. Ring 66 may also have a plurality of external projections 160 that are both decorative and functional in providing a contoured surface on the exterior of collar portion 156 to provide an improved gripping surface for a user.

Figure 17:
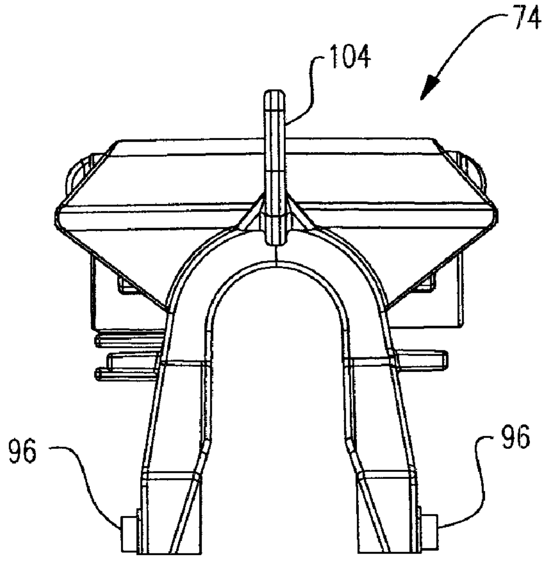
FIG. 17 is a front elevation view of the drive housing of FIG. 13.
Figure 18:
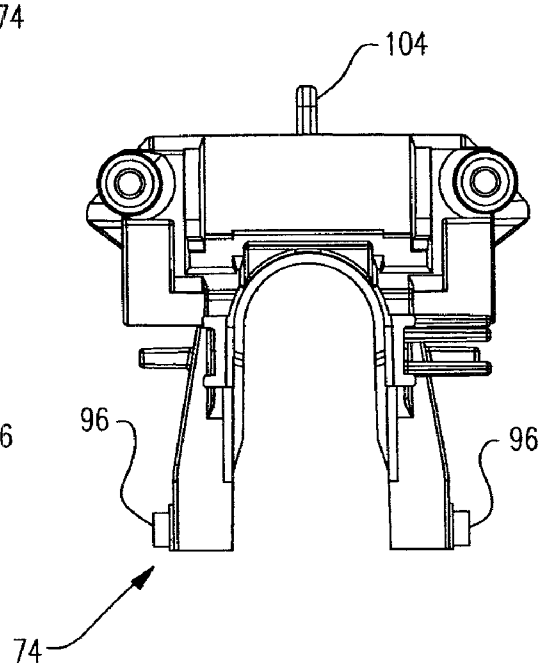
FIG. 18 is a rear elevation view of the drive housing of FIG. 13.
Figure 19:
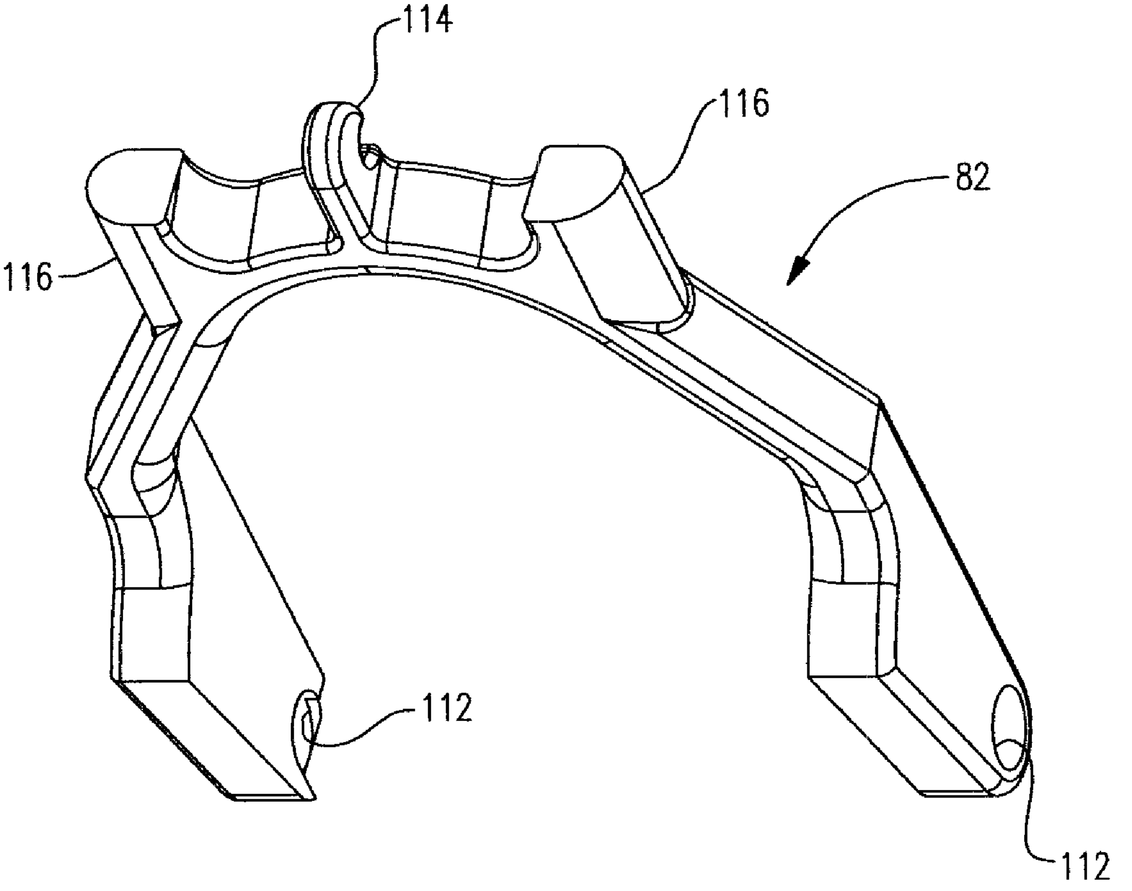
FIG. 19 is a perspective view of a lock lever useful in the practice of the present invention.
Figure 23:
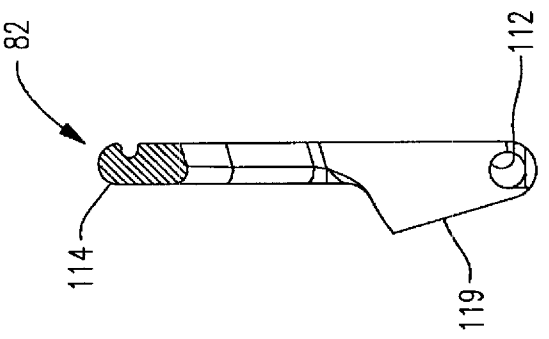
FIG. 23 is a section view of the lock lever taken along line XXIII-XXXIII of FIG. 21.
Figure 22:
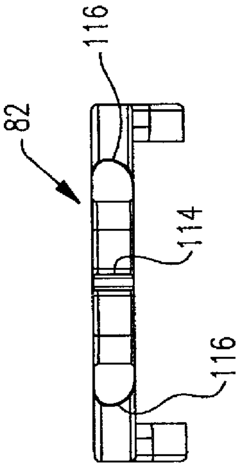
FIG. 22 is a top view of the lock lever of FIG. 19.
Figure 21:
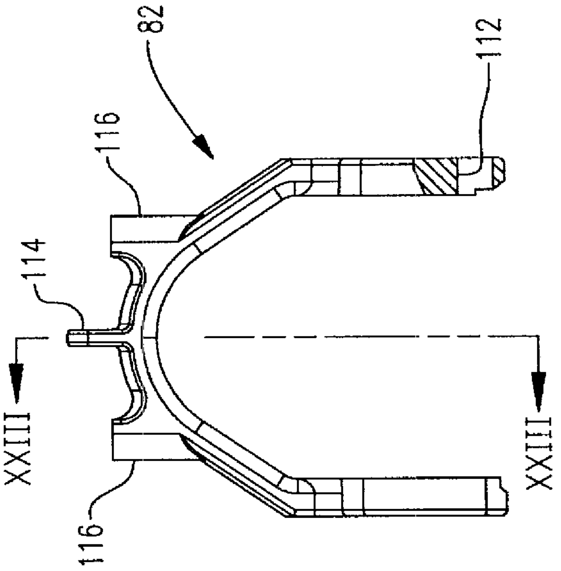
FIG. 21 is a partially cutaway front view of the lock lever of FIG. 19.
Figure 20:
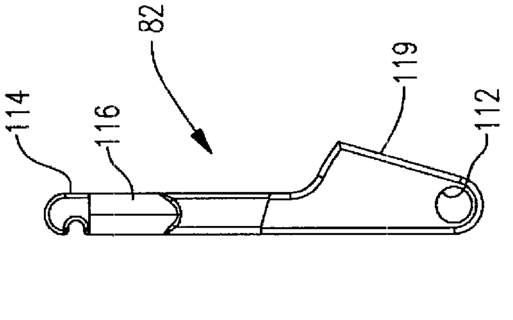
FIG. 20 is a side elevation view of the lock lever of FIG. 19.
Figure 24:
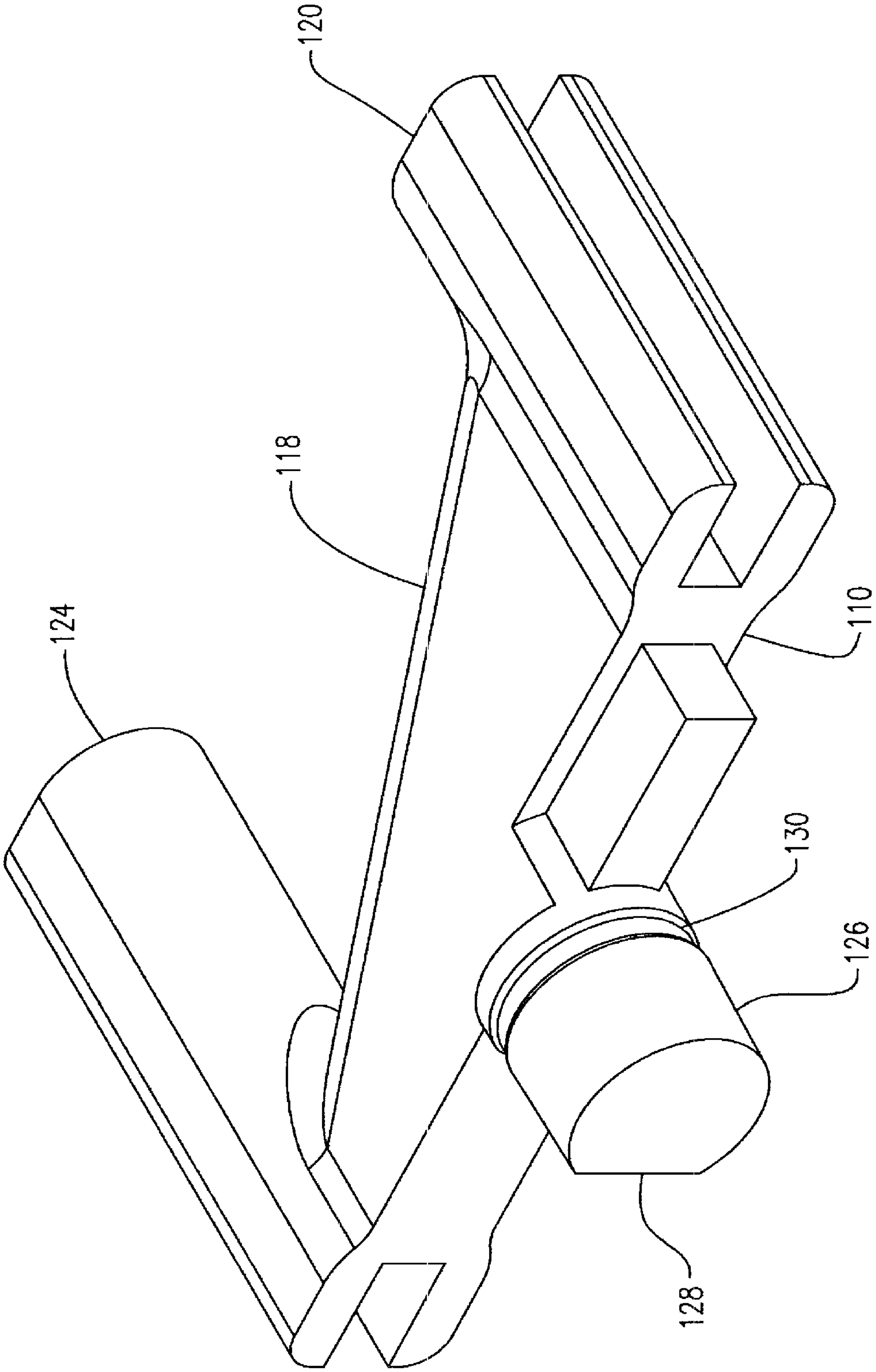
FIG. 24 is perspective view of a slide actuator useful in the practice of the present invention.
Figure 28:
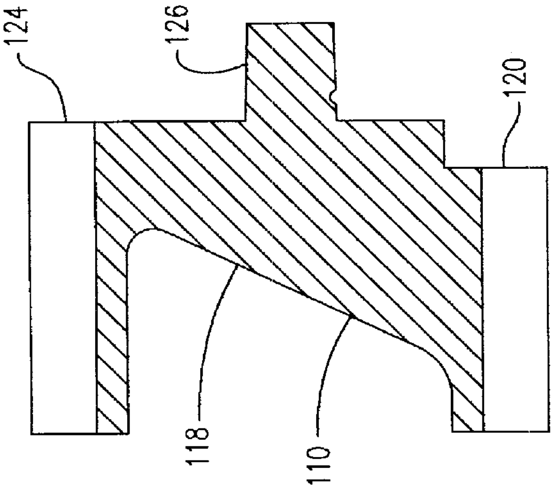
FIG. 28 is a front elevation view of the slide actuator of FIG. 24.
Figure 27:
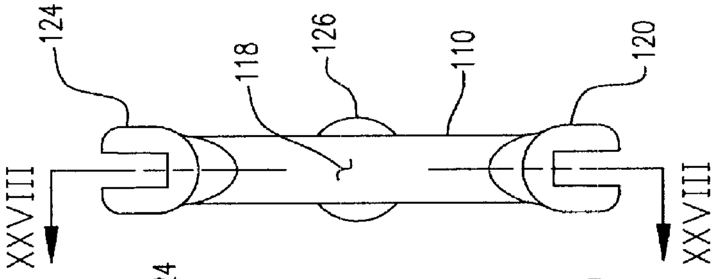
FIG. 27 is a second side view of the slide actuator of FIG. 24.
Figure 26:
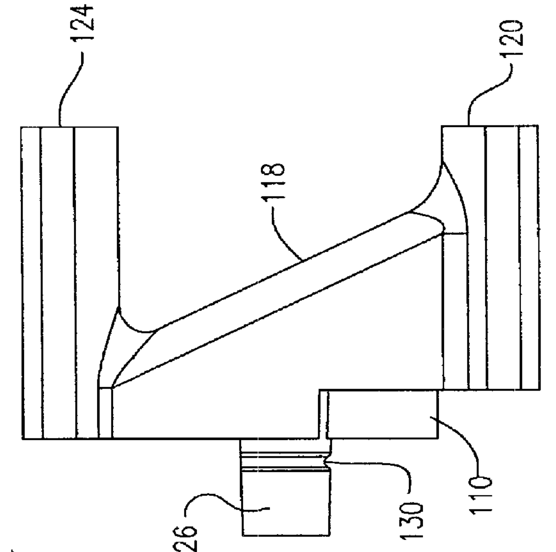
FIG. 26 is a top view of the slide actuator of FIG. 24.
Figure 25:
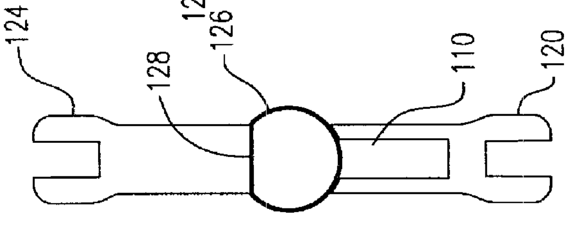
FIG. 25 is a first side view of the slide actuator of FIG. 24.
Figure 29:
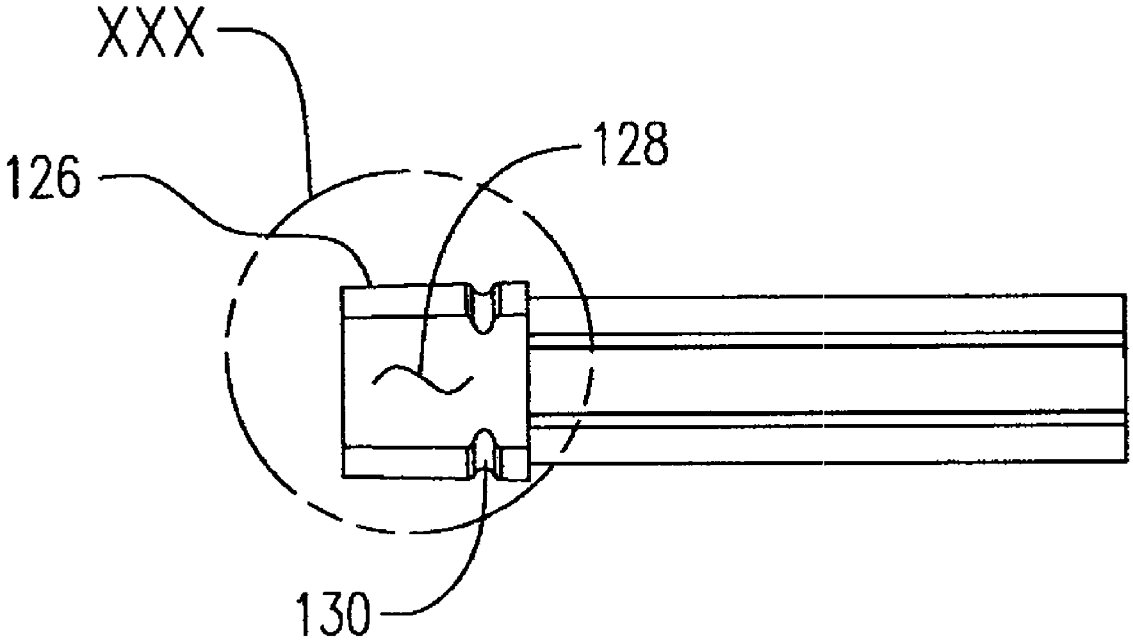
FIG. 29 is an end view of the slide actuator of FIG. 24.
Figure 30:
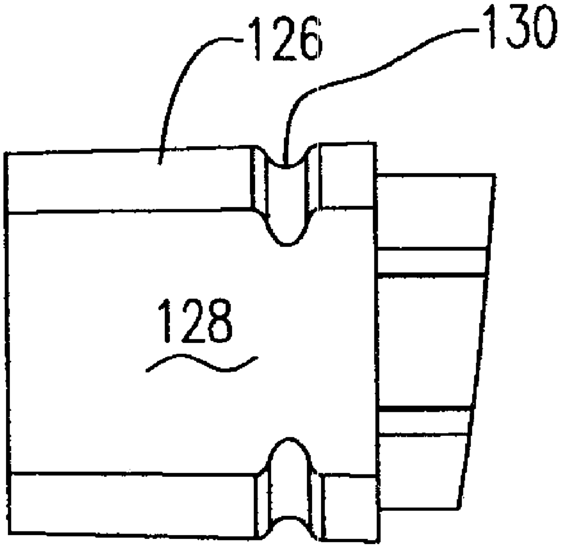
FIG. 30 is an enlarged view of detail XXX of FIG. 29.
Figure 31:
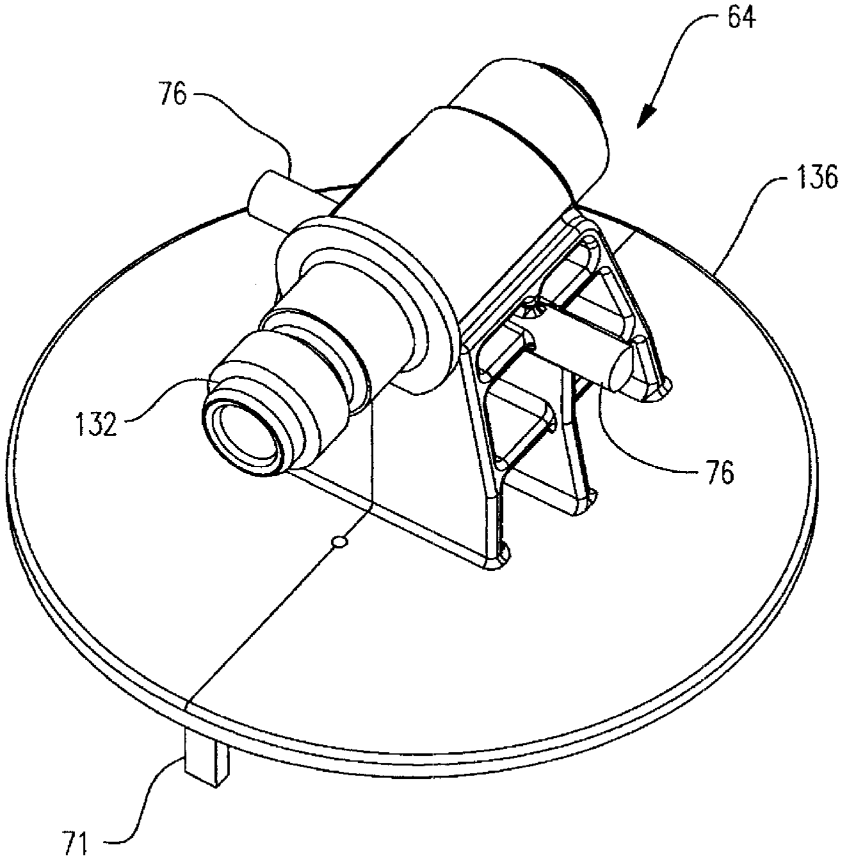
FIG. 31 is a perspective view of a pump housing and cylinder assembly useful in the practice of the present invention.
Figure 32:
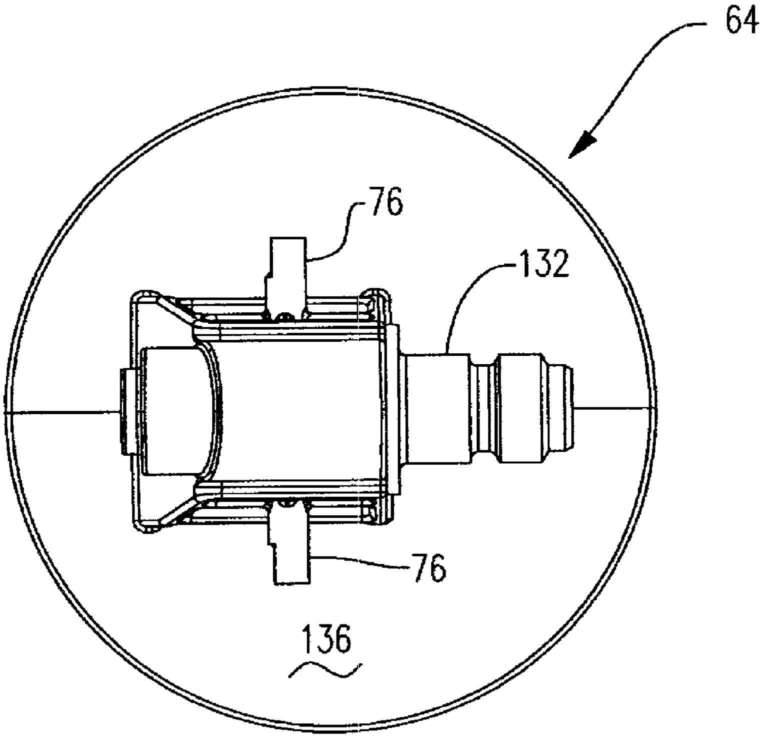
FIG. 32 is a top view of the pump housing and cylinder assembly of FIG. 31.
Figure 33:
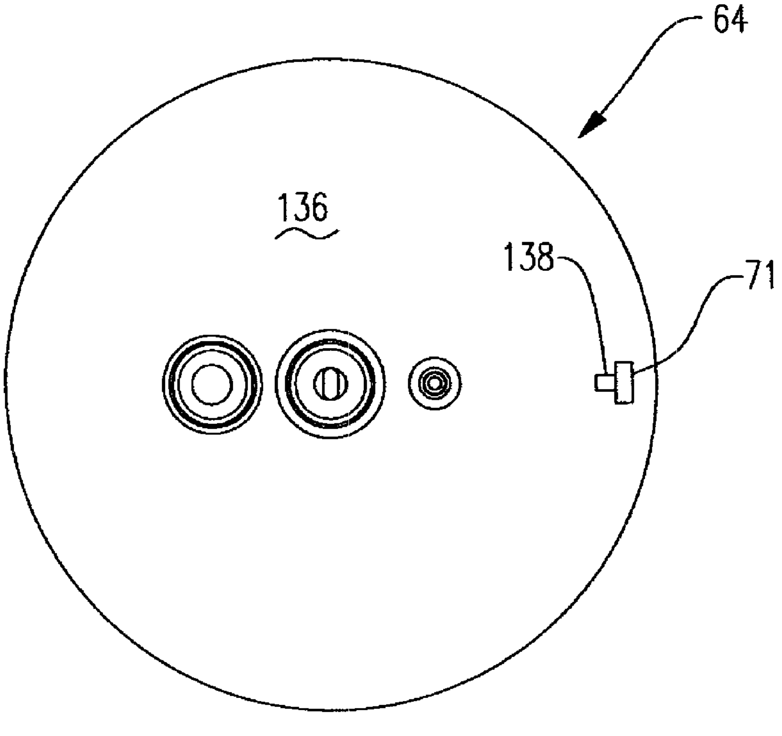
FIG. 33 is a bottom view of the pump housing and cylinder assembly of FIG. 31.
Figure 34:
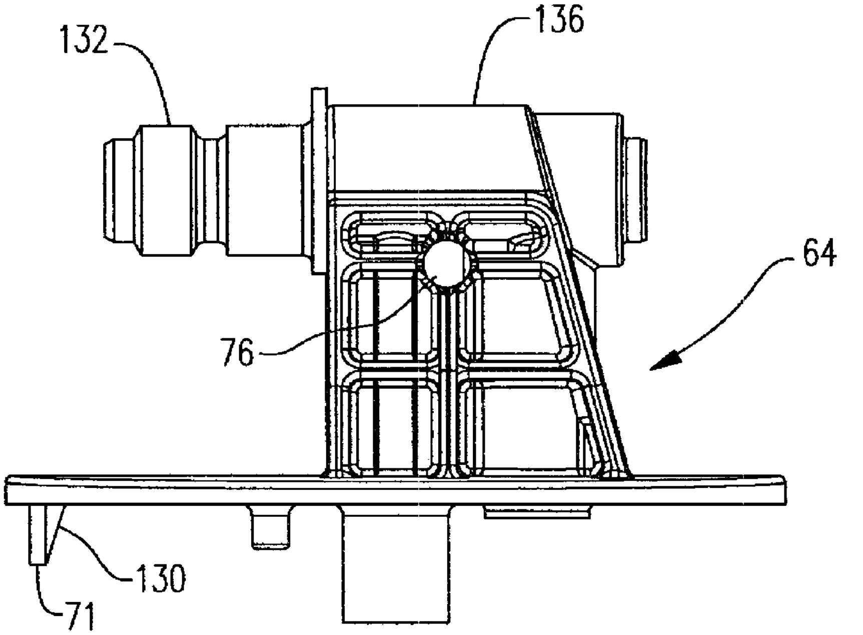
FIG. 34 is a side elevation view of the pump housing and cylinder assembly of FIG. 31.
Figure 35:
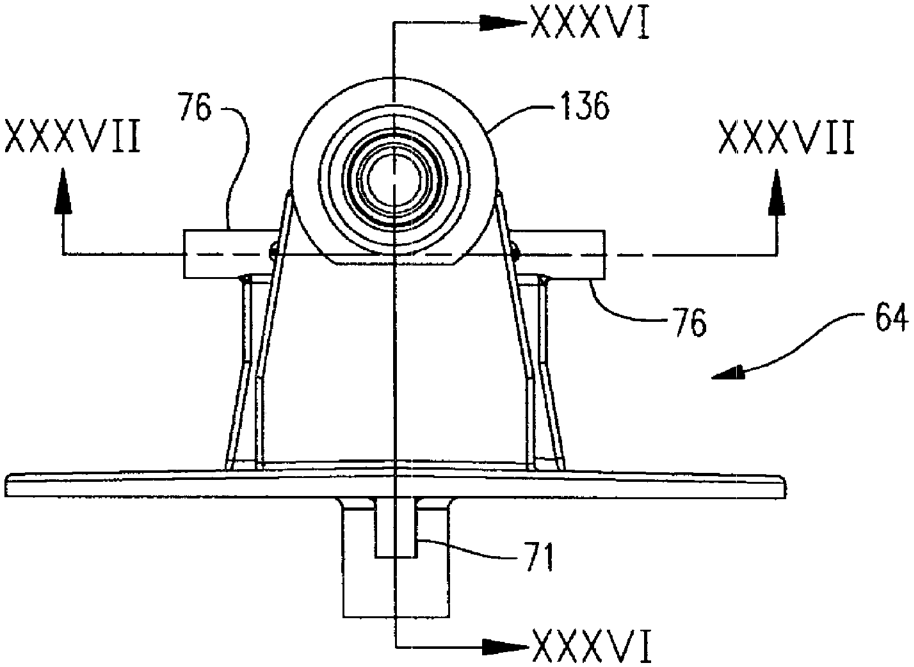
FIG. 35 is a front elevation view of the pump housing and cylinder assembly of FIG. 31.
Figure 36:
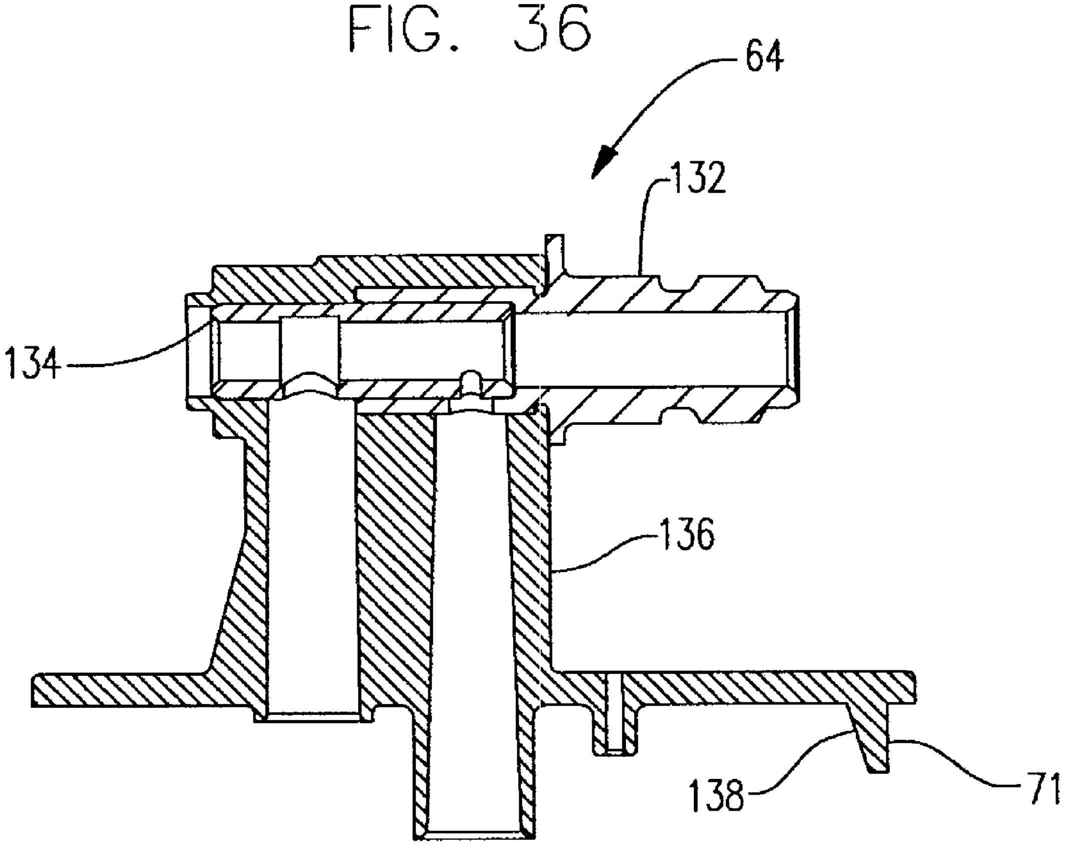
FIG. 36 is a section view taken along line XXXVI-XXXVI of FIG. 35.
Figure 37:
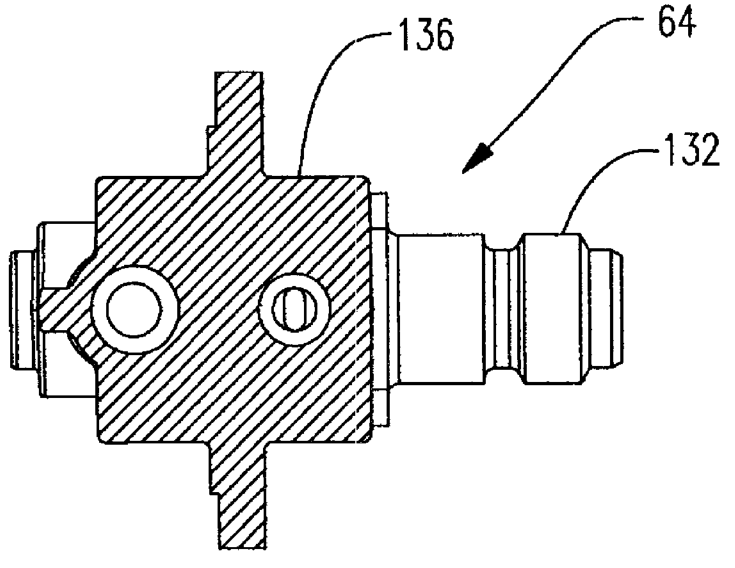
FIG. 37 is a section view taken along line XXXVII-XXXVII of FIG. 35.
Figure 38:
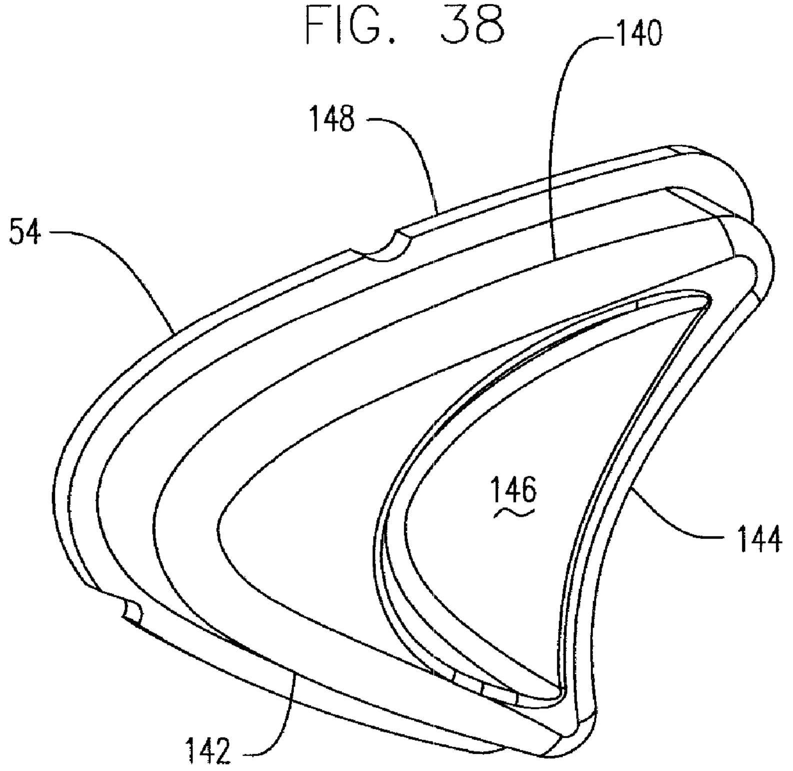
FIG. 38 is a perspective view of an external side of a pushbutton useful in the practice of the present invention.
Figure 39:
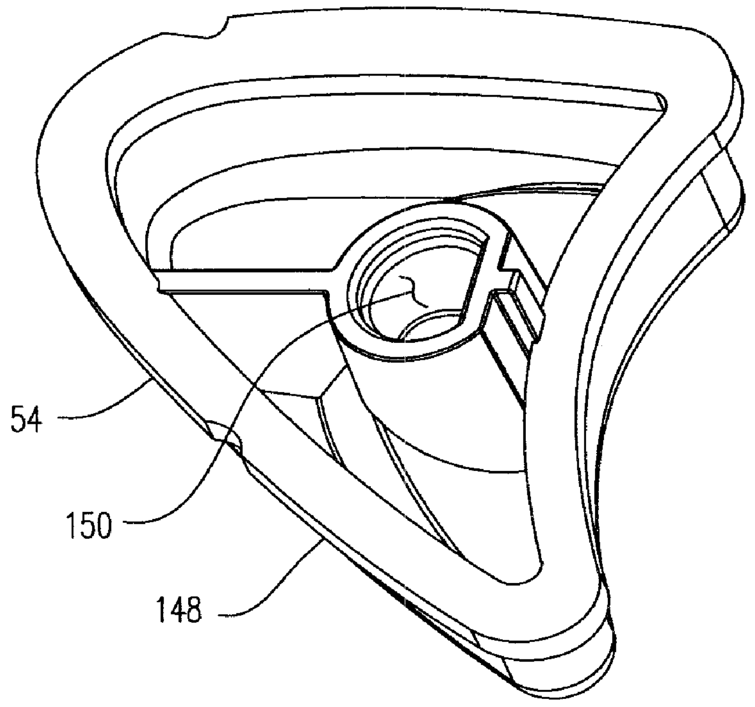
FIG. 39 is a perspective view of an internal side of the pushbutton of FIG. 38.
Figure 41:
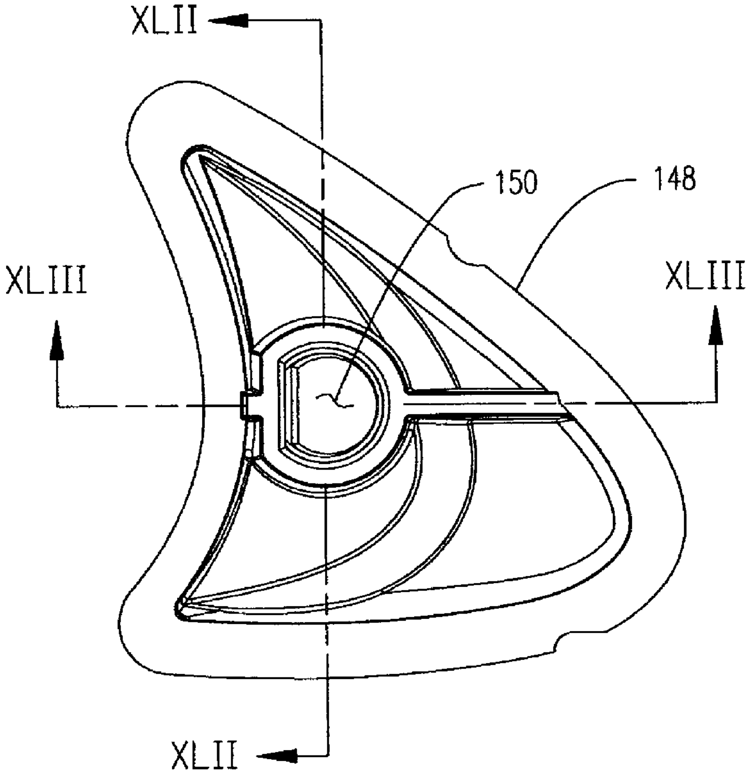
FIG. 41 is a side elevation view of the internal side of the pushbutton of FIG. 38.
Figure 42:
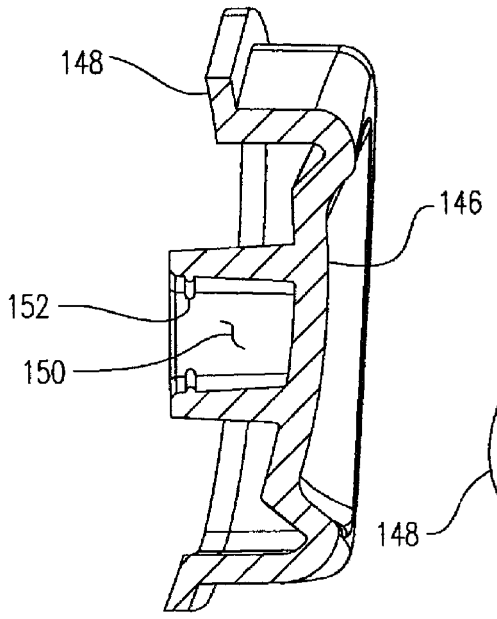
FIG. 42 is a section view taken along the line XLII-XLII of FIG. 41.
Figure 40:
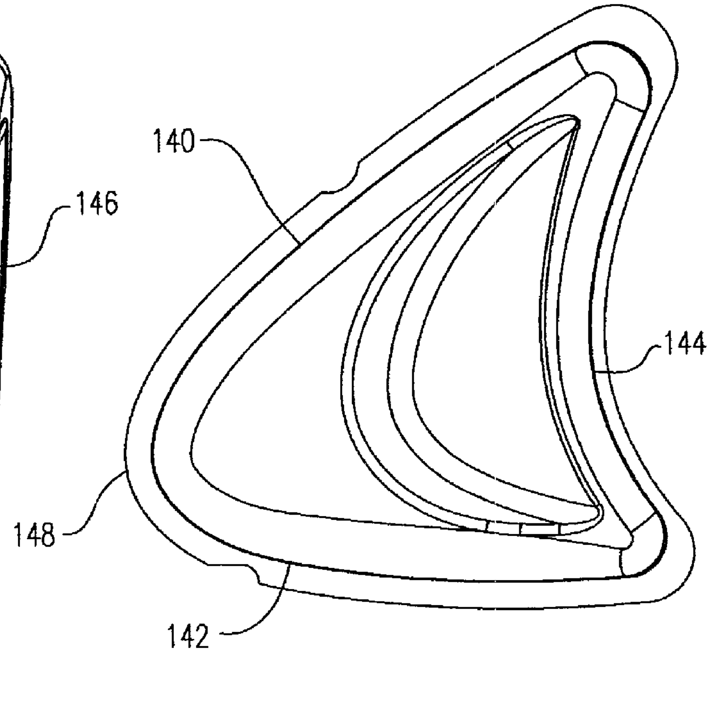
FIG. 40 is a side elevation view of the external side of the pushbutton of FIG. 38.
Figure 43:
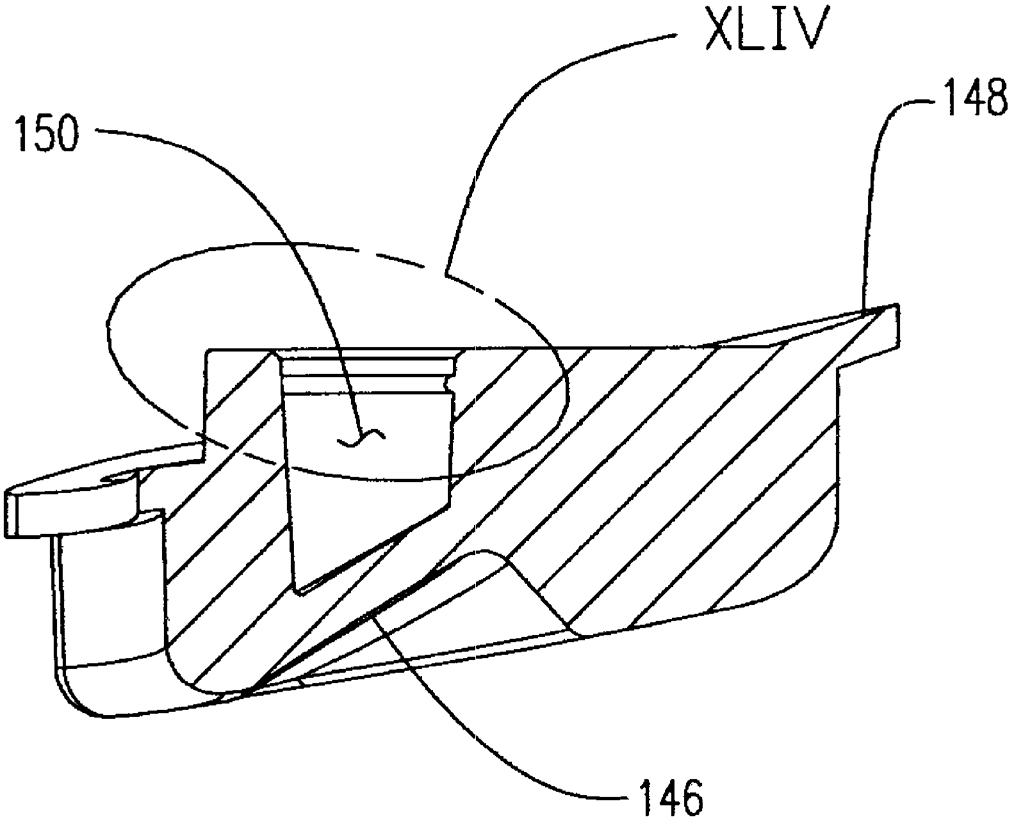
FIG. 43 is a section view taken along the line XLIII-XLIII of FIG. 41.
Figure 44:
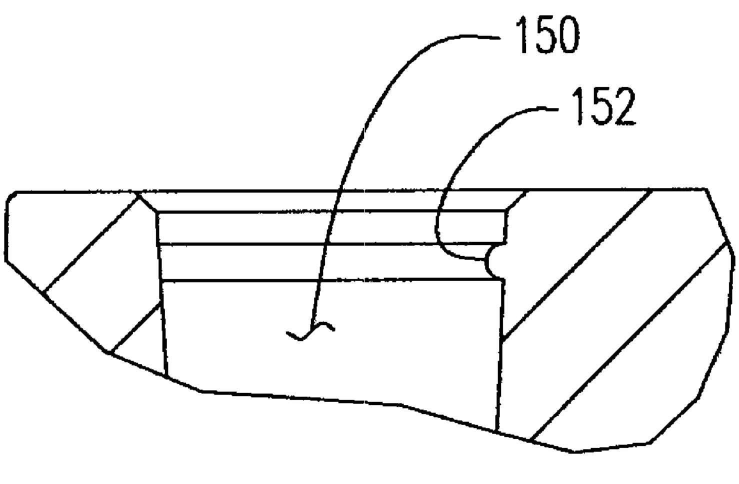
FIG. 44 is an enlarged view of detail XLIV of FIG. 43.
Figure 45:
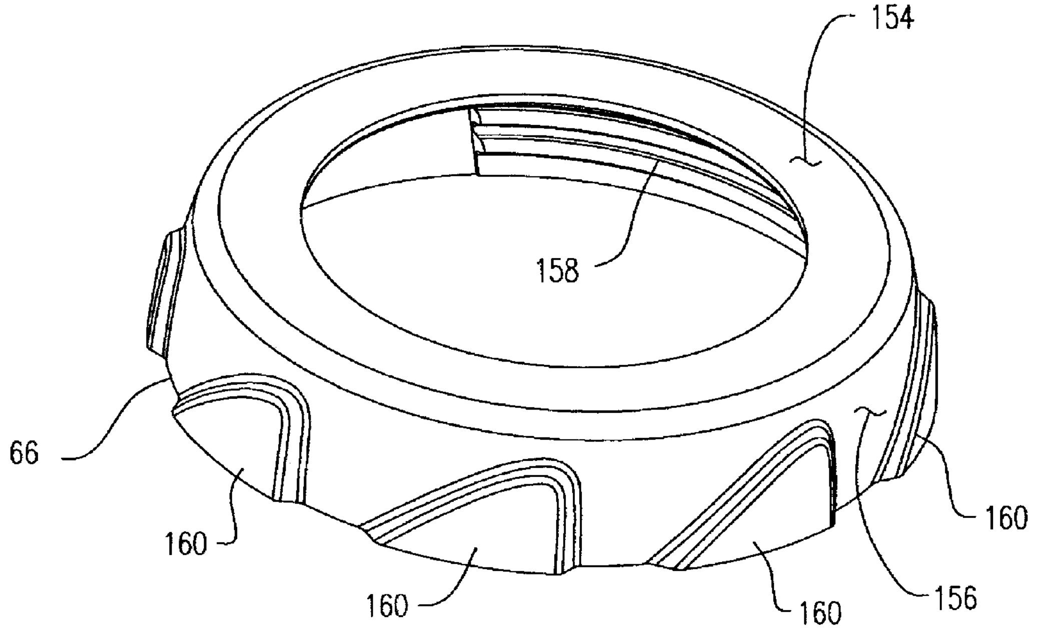
FIG. 45 is a perspective view of a paint cup retaining ring useful in the practice of the present invention.
Figure 46:
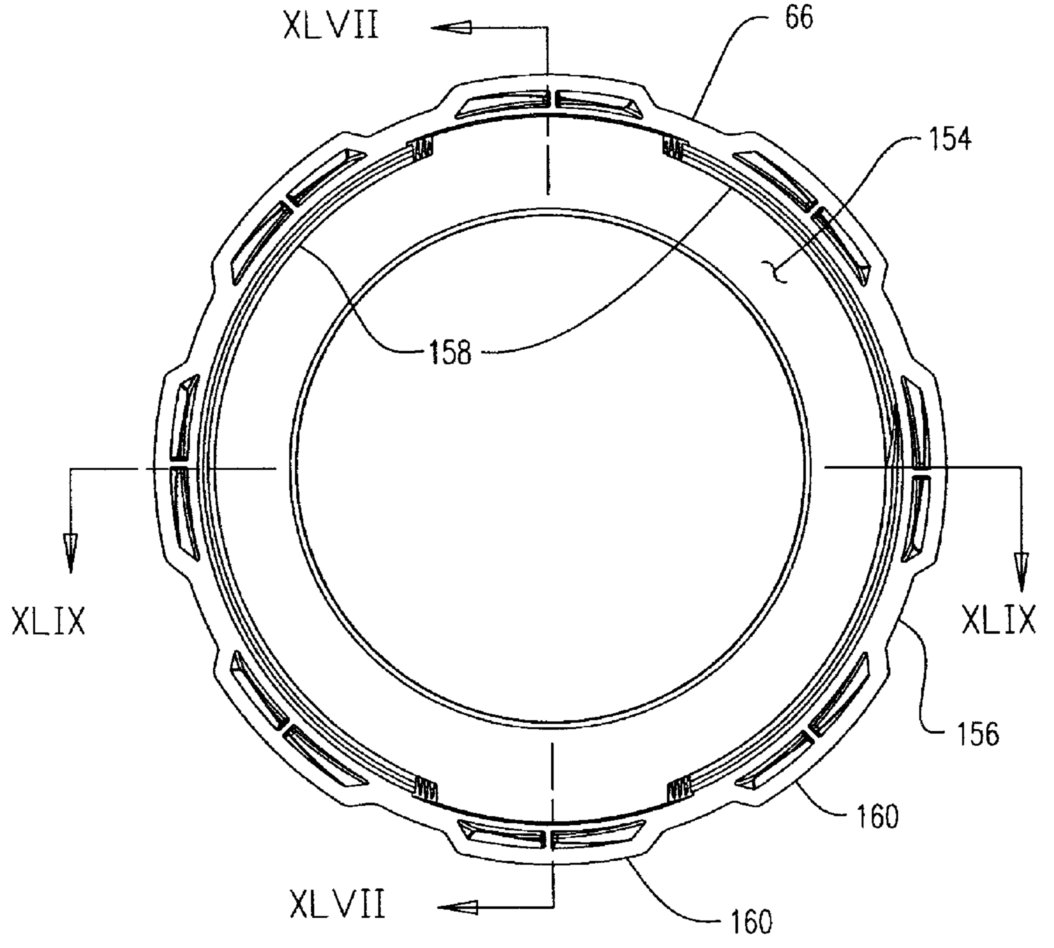
FIG. 46 is a bottom plan view of the ring of FIG. 45.
Figure 48:
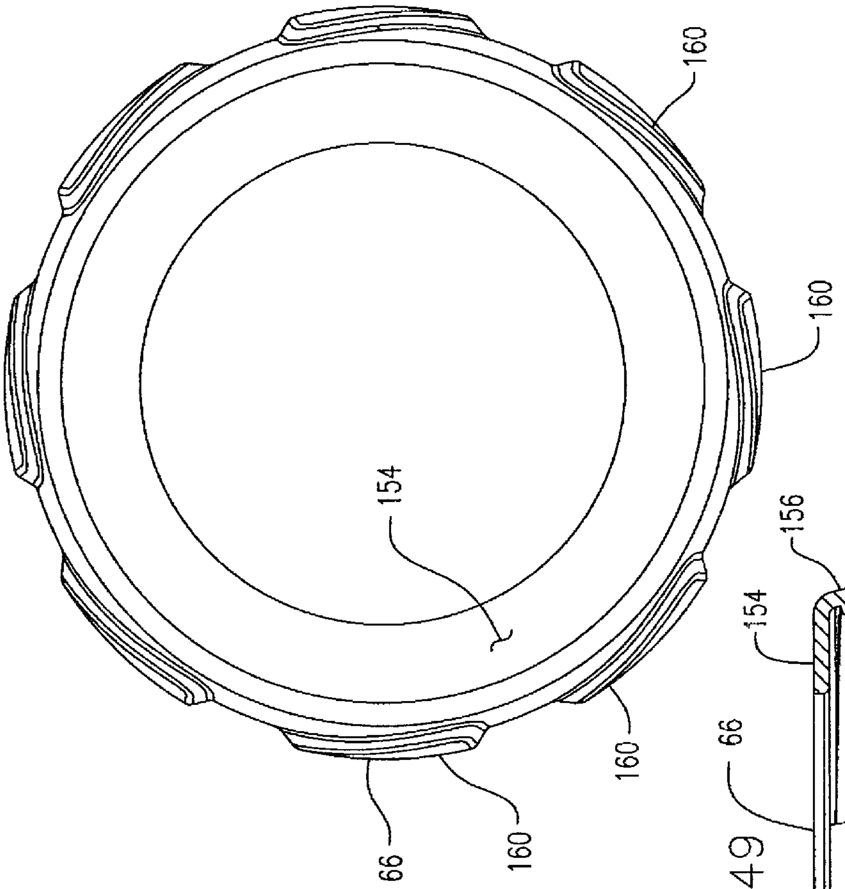
FIG. 48 is a top plan view of the ring of FIG. 45.
Figure 49:
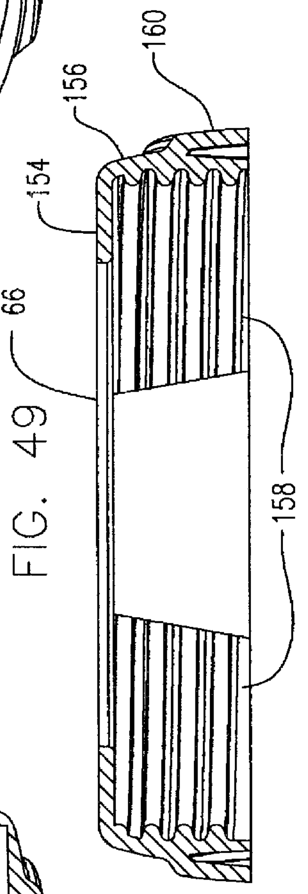
FIG. 49 is a section view taken along line XLIX-XLIX of FIG. 46.
Figure 47:
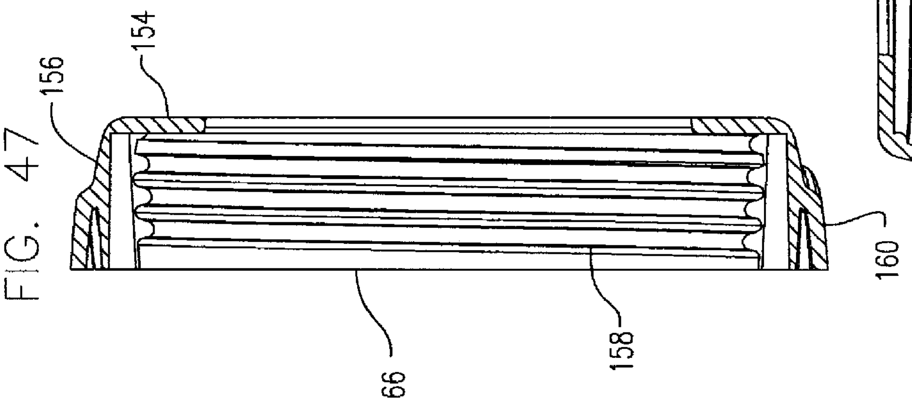
FIG. 47 is a section view taken along line XLVII-XLVII of FIG. 46.
Figure 55:
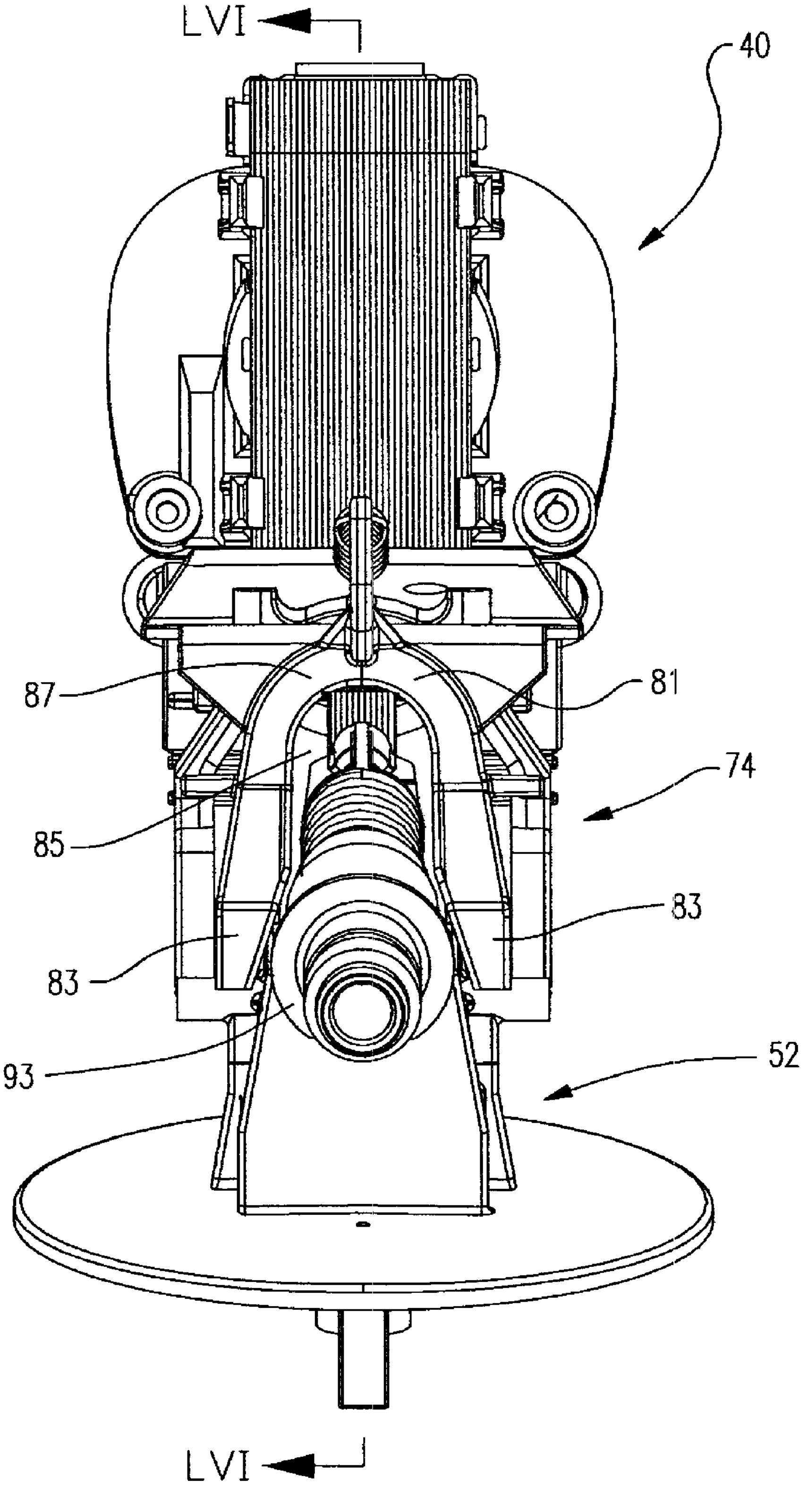
FIG. 55 is a front view of the paint spray gun with the wetted parts subassembly only partially assembled with the drive housing.
Figure 56:
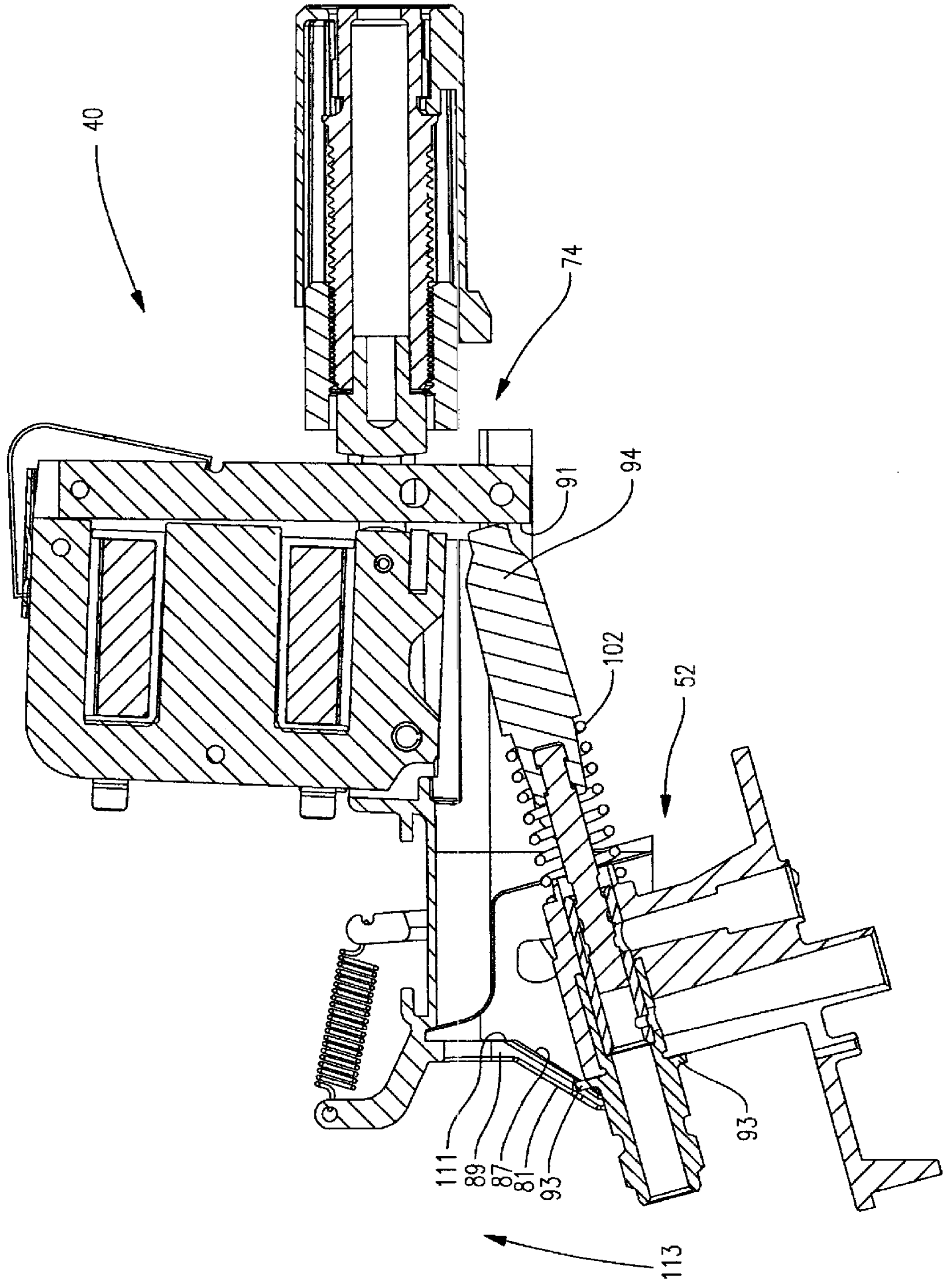
FIG. 56 is a side-sectional view of the paint spray gun of FIG. 55 taken along line LVI-LVI.
Figure 57:
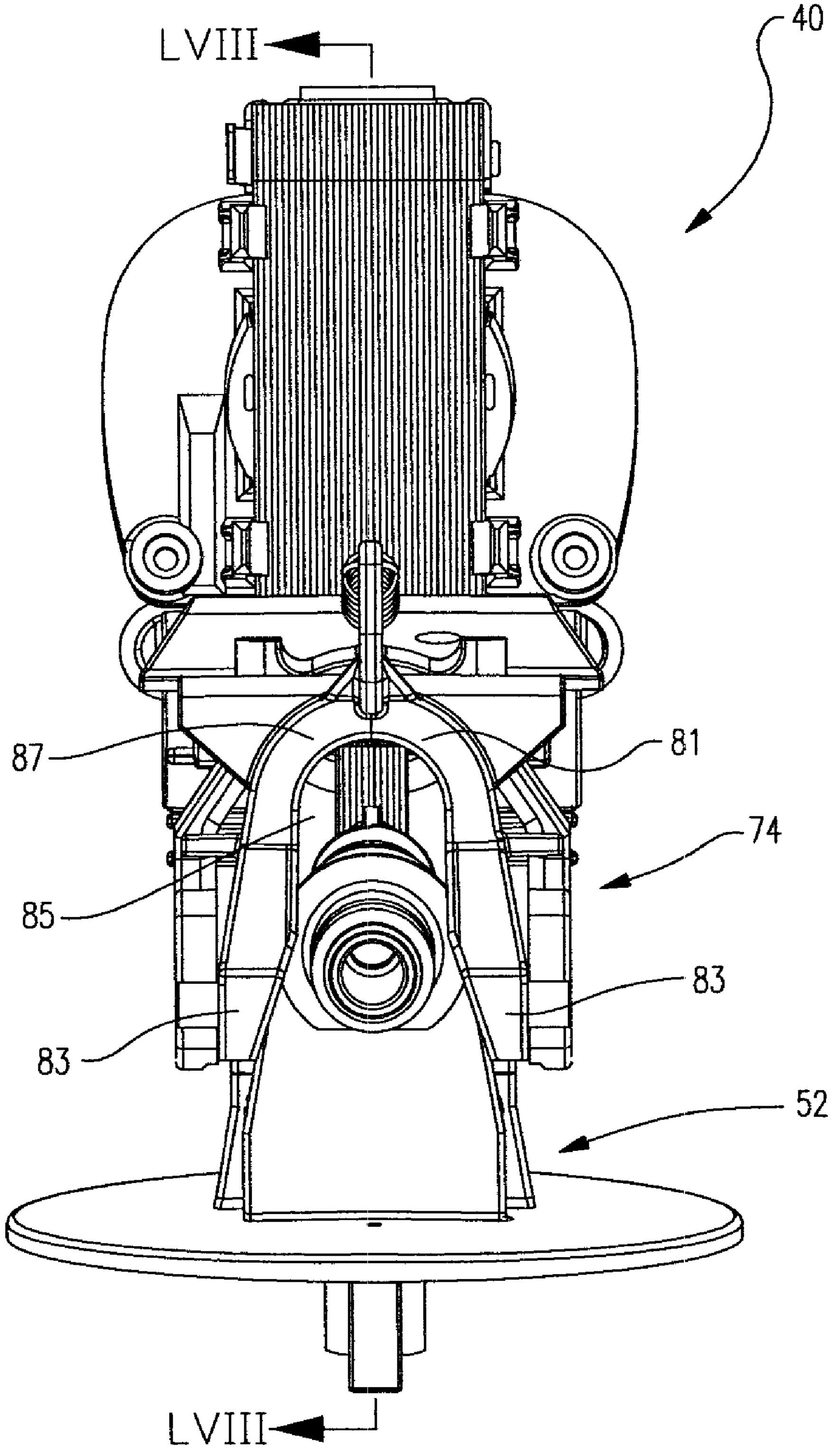
FIG. 57 is a front view of the paint spray gun of FIG. 55 with the wetted parts subassembly moved more closely to an assembled condition with the drive housing.
Figure 58:
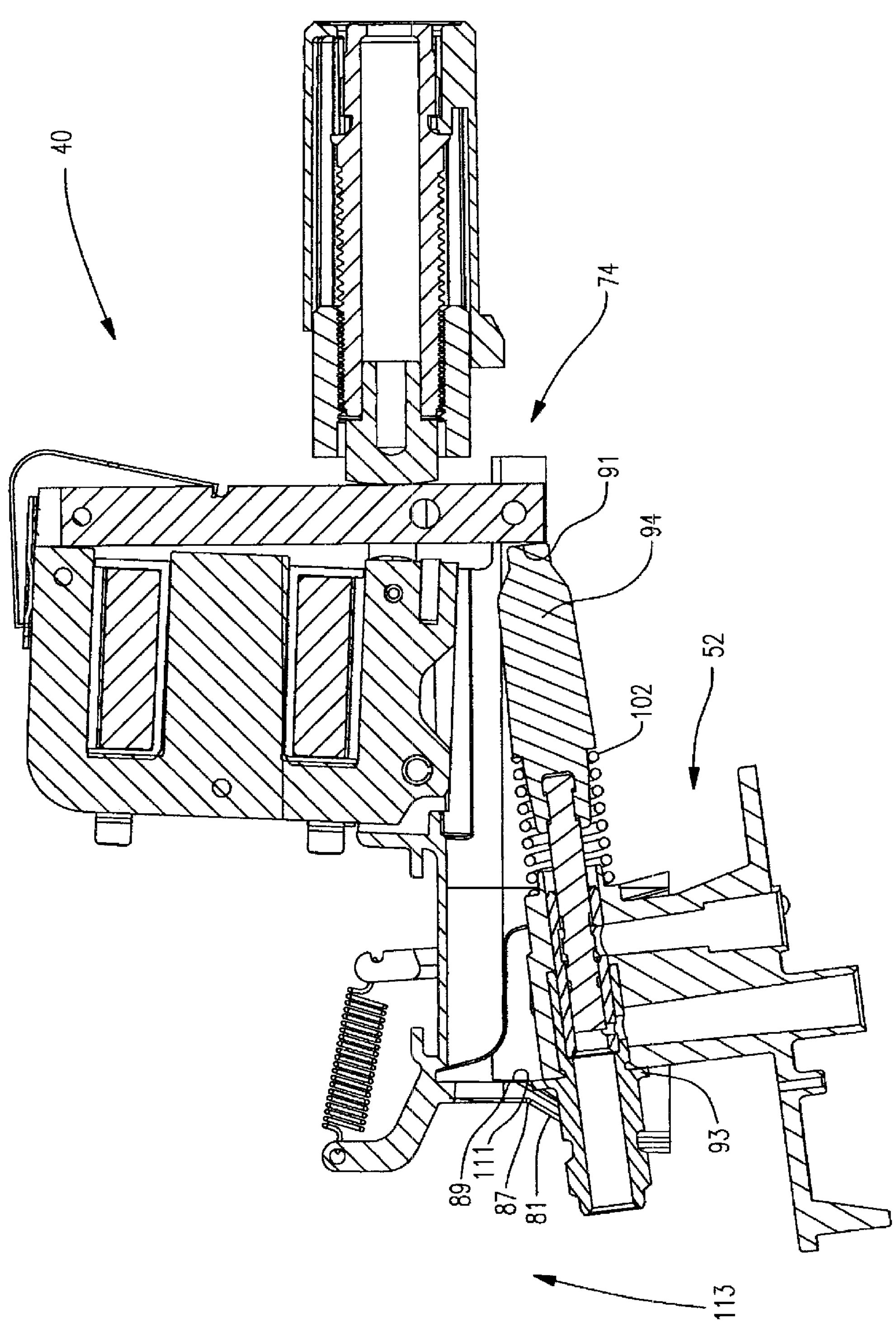
FIG. 58 is a side-sectional view of the paint spray gun of FIG. 57 taken along line LVIII-LVIII.

Referring now to FIGS. 55-60, front views (FIGS. 55, 57 and 59) and side cross-sectional views (FIGS. 56, 58 and 60) of the paint gun 40 illustrate the assembly of the wetted parts subassembly 52 with the drive housing 74. The drive housing 74 includes a downwardly oriented yoke or saddle 81 having a pair of opposed arms 83. The arms 83 define a gap 85 into which the wetted parts subassembly 52 is received when assembled with the drive housing 74. Each of the arms 83 includes an inner ramped surface 87 angling towards an apex 89 of the yoke 81. The arms 83 join one another at the apex 89 of the yoke 81. FIG. 17 shows a more detailed view of the yoke 81. To assemble the wetted parts subassembly 52 into the drive housing 74, the wetted parts subassembly 52 is pivoted against a pivot surface 91 of drive mechanism 72 at the rear of the drive housing 74 (FIGS. 55 and 56). The wetted parts subassembly 52 is pivoted against the pivot surface 91 and moved towards the apex 89 of the yoke 81 in the direction of arrow 113 (FIGS. 57 and 58). As the wetted parts subassembly 52 is moved upwardly, a flange 93 on the wetted parts subassembly 52 rides over the ramped surfaces 87 of the arms 83. This guides the wetted parts subassembly 52 into position within the yoke 81, providing a convenient means for guiding a user in assembly of the paint gun 40. In the fully assembled condition (FIGS. 59 and 60) the flange 93 is seated against a rear surface 111 of the apex 89 of the yoke 81. It should be understood that to disassemble paint gun 40, these steps are reversed.

Figure 59:
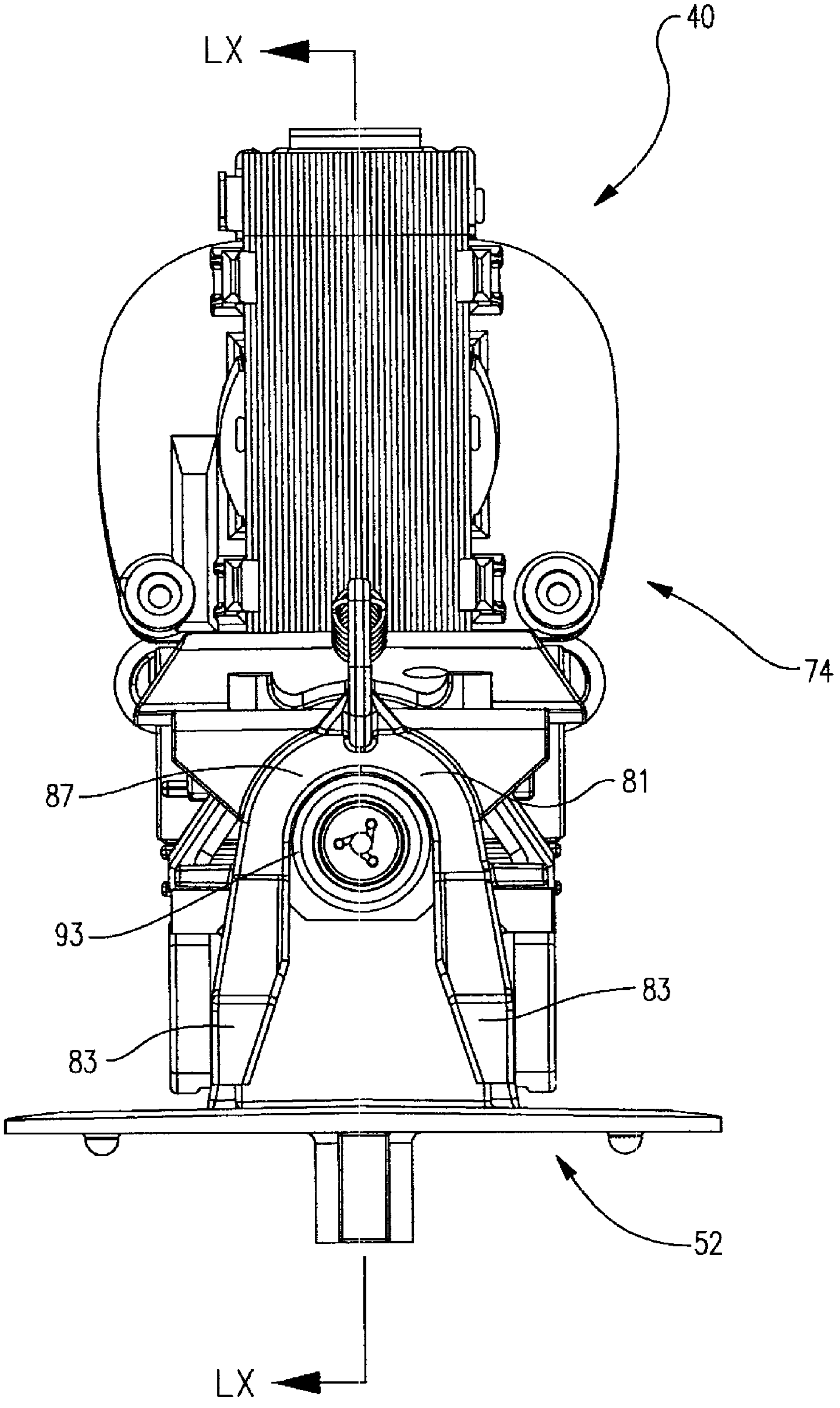
FIG. 59 is a front view of the paint spray gun of FIG. 55 in which the wetted parts subassembly is fully assembled with the drive housing.
Figure 60:
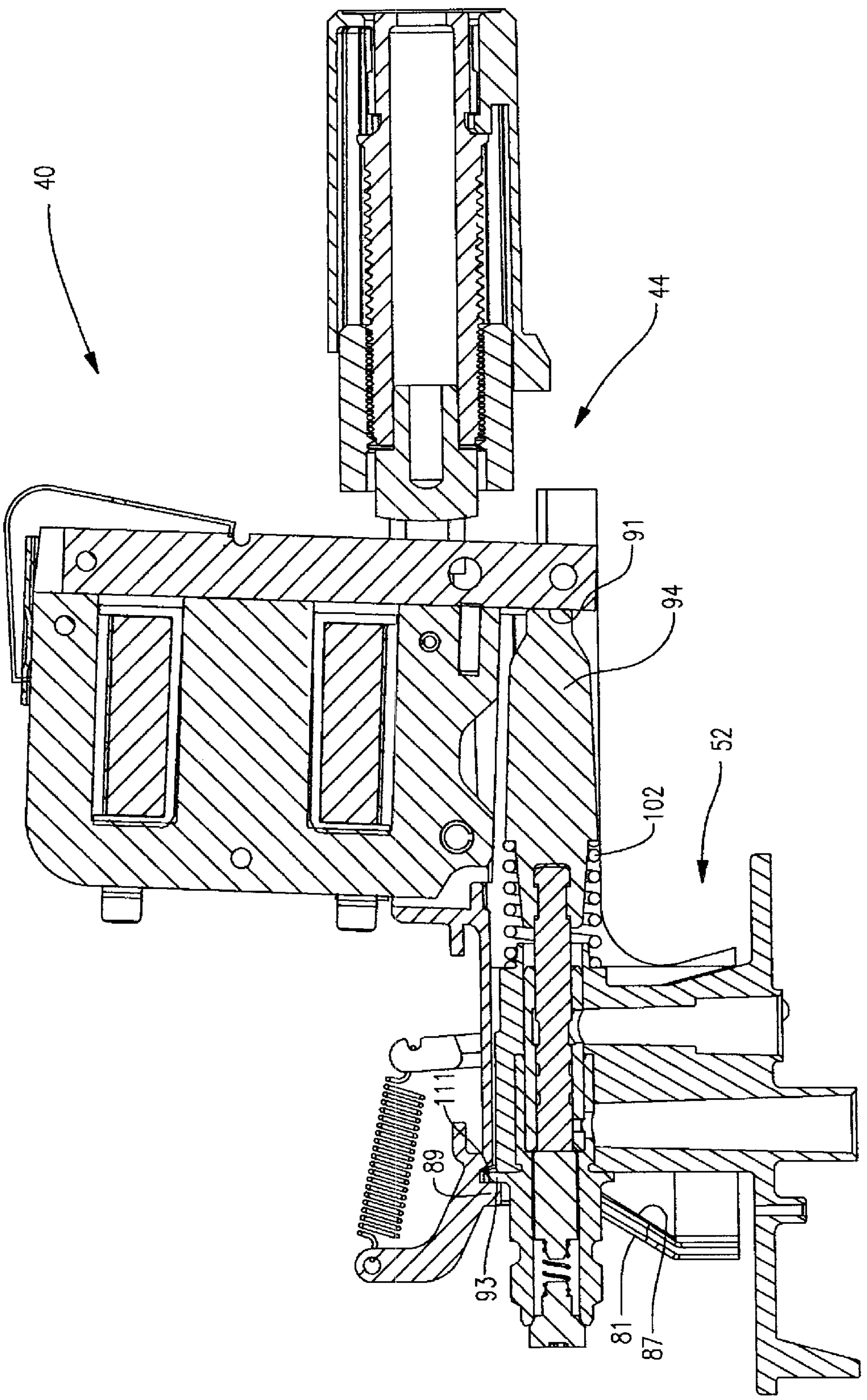
FIG. 60 is a side-sectional view of the paint spray gun of FIG. 59 taken along line LX-LX.
Figure 61:
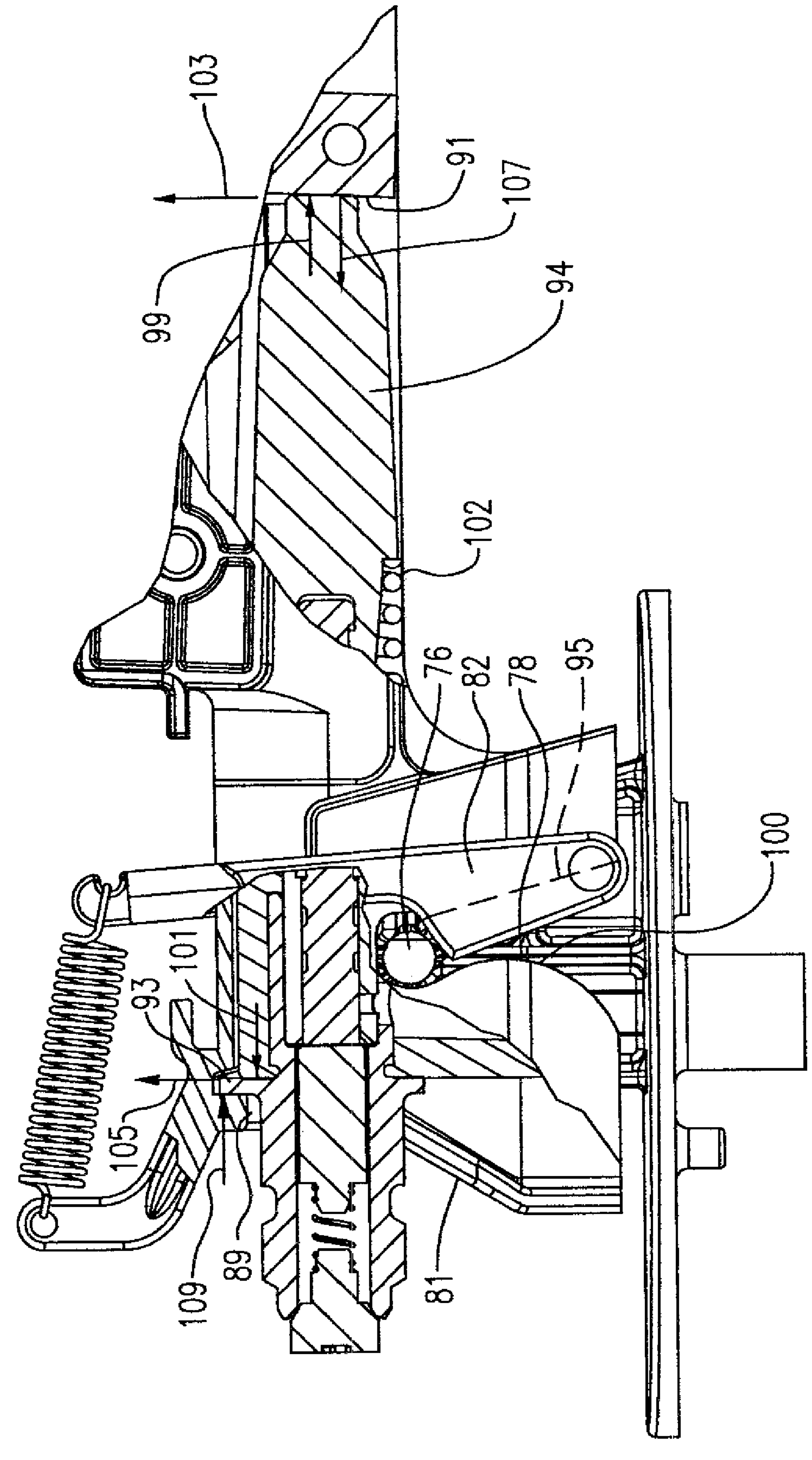
FIG. 61 is a side view, partly in section, of the paint spray gun of FIG. 60 with the protrusion shown in solid and lock lever shown partly in solid for clarity.

Referring now to FIG. 61, the piston return spring 102 is loaded or compressed when the wetted parts subassembly 52 is seated in the drive housing 74. This biases the piston 94 against the pivot surface 91 and the flange 93 against the rear surface 111 of apex 89 of the yoke 81, as indicated by arrows 99 and 101, respectively. The frictional forces between the piston 94 and the pivot surface 91 and between the flange 93 and the apex 89, indicated by arrows 103 and 105, respectively, retain the wetted part subassembly 52 in the assembled configuration. Thus, when the paint gun 40 is assembled, as shown in FIGS. 59 and 60, the wetted parts subassembly 52 tends to remain engaged with the drive housing 74 even without the locking mechanism as previously described. This feature prevents inadvertent disengagement of the wetted parts subassembly 52 from the drive housing 74 if the operator 54 is accidentally activated. Rather, in order to remove the wetted parts subassembly 52 from the drive housing 74, the user must disengage the operator 54 and exert a separating force on the wetted parts subassembly 52 and the drive housing 74.

Referring still to FIG. 61, when in the fully assembled condition, the protrusion 76 resides in the slot 78 without contact against either of the surfaces 95, 100 of the slot 78. Thus, the protrusion 76 does not absorb the force of the piston return spring 102, as indicated by the arrow 101, or the action of the piston 94 in operation, as indicated by arrow 107. Rather, these forces are transferred from the wetted parts subassembly 52 to the drive housing 74 at the interface between the flange 93 and the yoke 81, as indicated by arrow 109. Thus, the protrusion 76 is isolated from the forces of the piston return spring 102 and the operating piston 94 on the drive housing 74. The yoke 81 and flange 93 may be made of a heavy duty material (such as one or more metals) to withstand operating stresses but the protrusions 76 need not be. The protrusion 76 may be made of a less stress resistant material, such as a polymer, without degrading the wear characteristics of the paint gun 40.

Referring now still to FIG. 61, through operation of the paint gun, the rear surface 111 of yoke 81 and flange 93 bear against one another. The piston return spring 102 biases the flange 93 towards the yoke 81 as the contacting surfaces wear. The lock lever 82 is also biased forwardly by the spring 86. The protrusion 76 thus remains securely captured within the slot 78 by the lock lever 82 despite wear to the interface between the flange 93 and yoke 81. This reduces the likelihood of the paint gun 40 inadvertently disassembling or the wetted parts subassembly 52 rattling or jiggling with respect to the drive housing 74 when assembled.

In one embodiment, the present invention may be characterized as a passive retention system for retaining the wetted parts subassembly 52 to the drive housing 74. The passive retention system provides a primary mechanism for retaining the wetted parts subassembly 52 to the drive housing 74, while the interaction of the protrusion 76 and lock lever 82 provides a secondary mechanism for retaining the wetted parts subassembly 52 to the drive housing 74. In one embodiment, the passive retaining system reduces or eliminates the stresses on the protrusions 76 as they retain the wetted parts subassembly 52 to the drive housing 74. In another embodiment, the passive retaining system retains the wetted parts subassembly 52 to the drive housing 74 even when the lock lever 82 is in the release position. The passive retention system frictionally engages the wetted parts subassembly 52 to the drive housing 74 when the wetted parts subassembly is seated within the yoke 81.

In another embodiment, the present invention may be characterized as an interface between the wetted parts subassembly 52 that isolates the protrusion 76 while transferring the forces of the piston return spring 102 and the operation of the piston 94 from the wetted parts subassembly 52 thanks to the drive housing 74.

This invention is not to be taken as limited to all of the details thereof as modifications and variations thereof may be made without departing from the spirit or scope of the invention.

The invention claimed is:

1. A paint spray gun comprising:

a wetted parts subassembly including:

a spray tip;

a pump housing and cylinder assembly;

a paint cup; and at least one protrusion on the pump housing and cylinder assembly;

a paint spray gun housing;

a frame within the paint spray gun housing, the frame having at least one slot aligned to receive the at least one protrusion on the pump housing and cylinder assembly when the wetted parts subassembly is received in the frame;

a lock lever attached to the frame adjacent the at least one slot and movable between a latched position in which the lock lever holds the at least one protrusion in the at least one slot and thus secures the wetted parts subassembly to the frame and an unlatched position in which the lock lever releases the at least one protrusion and thus releases the wetted parts subassembly from the frame, the lock lever biased to the latched position;

at least one pushbutton extending through an aperture in the paint spray gun housing and operably coupled to the lock lever such that pushing the pushbutton causes the lock lever to move from the latched position to the unlatched position and releasing the pushbutton causes the lock lever to return to the latched position, the lock lever being configured such that the wetted parts subassembly can be reattached to the frame by inserting the at least one protrusion into the at least one slot without having to push the at least one pushbutton.

2. The paint spray gun of claim 1 wherein the lock lever is generally U shaped and is pivotably attached to the frame.

3. The paint spray gun of claim 1 further comprising means for biasing the lock lever into the latched position.

4. The paint spray gun of claim 3 wherein the means for biasing comprises a spring.

5. The paint spray gun of claim 1 wherein the lock lever has a cam surface overlapping the at least one slot when the lock lever is in the latched position.

6. The paint spray gun of claim 5 wherein the cam surface is moved out of the overlapping relationship with the at least one slot when the wetted parts subassembly is moved from a retained position in which the at least one protrusion is received in the at least one slot to a released position.

7. The paint spray gun of claim 1 wherein the cam surface blocks the at least one protrusion from retracting out of the slot when the lock lever is in the latched position.

8. The paint spray gun of claim 7 wherein the cam surface of the lock lever is moved clear of the at least one protrusion when the lock lever is in the unlatched position.

9. The paint spray gun of claim 1 wherein the at least one slot has an open proximal end and a closed distal end.

10. The paint spray gun of claim 9 wherein a width of the closed distal end of the at least one slot is greater than a minimum width of the slot located intermediate the proximal and distal ends.

11. The paint spray gun of claim 10 wherein the at least one slot has one generally straight side.

12. The paint spray gun of claim 10 wherein a width of the open proximal end of the at least one slot is greater than the minimum width of slot.

13. The paint spray gun of claim 1 wherein the at least one pushbutton is movable along a pushbutton axis and the at least one slide actuator is located between the at least one pushbutton and an arm pivotably mounted on the frame and is movable generally in line with the pushbutton axis wherein a sliding contact occurs between the at least one slide actuator and the arm to move the arm generally perpendicularly to the pushbutton axis.

14. The paint spray gun of claim 13 wherein the at least one slide actuator has a ramp surface in contact with the arm.

15. The paint spray gun of claim 14 wherein the arm has a drive surface facing the at least one protrusion when the wetted parts subassembly moves into engagement with the paint spray gun housing such that the at least one protrusion moves the arm temporarily out of the way of the at least one protrusion to allow assembly of the wetted parts subassembly to the frame.

16. The paint spray gun of claim 5 in which the at least one pushbutton is operable to actuate the lock lever to move the cam surface out of engagement with the at least one protrusion to release the wetted parts subassembly from the frame.

17. The paint spray gun of claim 1, further comprising at least one slider assembly disposed between the at least one pushbutton and the lock lever such that pushing the pushbutton causes the slider assembly to engage the lock lever and move the lock lever from the latched position to the unlatched position.

* * * * *